(12) United States Patent
Han et al.

(10) Patent No.: US 8,472,464 B2
(45) Date of Patent: Jun. 25, 2013

(54) METHOD AND APPARATUS FOR INFORMATION TRANSMISSION IN WIRELESS TRANSMISSION SYSTEM

(75) Inventors: Seung Hee Han, Anyang-si (KR); Sung Ho Moon, Anyang-si (KR); Hyun Soo Ko, Anyang-si (KR); Jae Hoon Chung, Anyang-si (KR); Moon Il Lee, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 250 days.

(21) Appl. No.: 13/128,404

(22) PCT Filed: Nov. 16, 2009

(86) PCT No.: PCT/KR2009/006725
§ 371 (c)(1),
(2), (4) Date: May 9, 2011

(87) PCT Pub. No.: WO2010/056079
PCT Pub. Date: May 20, 2010

(65) Prior Publication Data
US 2011/0216733 A1 Sep. 8, 2011

Related U.S. Application Data

(60) Provisional application No. 61/114,479, filed on Nov. 14, 2008, provisional application No. 61/115,113, filed on Nov. 17, 2008, provisional application No. 61/249,977, filed on Oct. 8, 2009.

(51) Int. Cl.
*H04L 5/14* (2006.01)
*H04L 27/00* (2006.01)
*H04L 1/02* (2006.01)
*H04B 7/208* (2006.01)
*H04B 7/216* (2006.01)

(52) U.S. Cl.
USPC ........... 370/441; 370/295; 370/344; 375/295; 375/299; 375/267

(58) Field of Classification Search
None
See application file for complete search history.

(56) References Cited

U.S. PATENT DOCUMENTS 7,940,740 B2 * 5/2011 Krishnamurthy et al. .... 370/344
8,315,325 B2 * 11/2012 Lee et al. ...................... 375/267
(Continued)

FOREIGN PATENT DOCUMENTS

KR 10-2006-0035941 A 4/2006
KR 10-2006-0128076 A 12/2006
KR 10-2008-0071065 A 8/2008

OTHER PUBLICATIONS

Korean Intellectual Property Office Application Serial No. 10-2011-7010862, Notice of Allowance dated Dec. 31, 2012, 2 pages.

(Continued)

*Primary Examiner* — Hassan Phillips
*Assistant Examiner* — Hicham Foud
(74) *Attorney, Agent, or Firm* — Lee, Hong, Degerman, Kang & Waimey

(57) ABSTRACT

Provided are a method of information transmission performed by a transmitter in a wireless transmission system and an apparatus for same. Said method comprises a step wherein a first information sequence is generated based on a first transmission symbol and a first resource index, a second information sequence is generated based on a second transmission symbol and a second resource index, a third information sequence is generated based on a third transmission symbol and a third resource index, a fourth information sequence is generated based on a fourth transmission symbol and a fourth resource index, a fifth information sequence is generated based on a fifth transmission symbol and a fifth resource index, a sixth information sequence is generated based on a sixth transmission symbol and a sixth resource index; and a step wherein said first information sequence, said second information sequence, and said third information sequence are transmitted via a first antenna, and said fourth information sequence, said fifth information sequence, and said sixth information sequence are transmitted via a second antenna, respectively.

11 Claims, 29 Drawing Sheets

U.S. PATENT DOCUMENTS

| | | | |
|---|---|---|---|
| 2004/0196919 A1* | 10/2004 | Mehta et al. | 375/267 |
| 2006/0034386 A1* | 2/2006 | Vummintala et al. | 375/267 |
| 2006/0034390 A1* | 2/2006 | Vummintala et al. | 375/299 |
| 2006/0039496 A1* | 2/2006 | Chae et al. | 375/267 |
| 2007/0171808 A1* | 7/2007 | Wu et al. | 370/208 |
| 2008/0014870 A1* | 1/2008 | Kim | 455/69 |
| 2008/0075184 A1 | 3/2008 | Muharemovic et al. | |
| 2008/0095254 A1 | 4/2008 | Muharemovic et al. | |
| 2008/0117833 A1* | 5/2008 | Borran et al. | 370/252 |
| 2008/0165893 A1* | 7/2008 | Malladi et al. | 375/299 |
| 2008/0233966 A1 | 9/2008 | Scheim et al. | |
| 2009/0059884 A1 | 3/2009 | Zhang et al. | |
| 2009/0092073 A1* | 4/2009 | Doppler et al. | 370/315 |
| 2009/0109908 A1* | 4/2009 | Bertrand et al. | 370/329 |
| 2009/0175159 A1* | 7/2009 | Bertrand et al. | 370/203 |
| 2009/0213955 A1* | 8/2009 | Higuchi et al. | 375/267 |
| 2012/0014243 A1* | 1/2012 | Bertrand et al. | 370/203 |

OTHER PUBLICATIONS

Lang Tong et al., "Pilot-assisted wireless transmissions: general model, design criteria, and signal processing", IEEE Signal Processing Magazine, vol. 21, Issue: 6, Nov. 2004.

Ghosh et al., "Multi-Antenna System Design for 3GPP LTE," IEEE International Symposium on Wireless Communication Systems, pp. 478-482, Oct. 2008.

Meng et al., "A Novel Space-Frequency Block Coding Scheme for SC-FDMA," IEEE 70th Vehicular Technology Conference Fall, pp. 1-5, Sep. 2009.

* cited by examiner

METHOD AND APPARATUS FOR INFORMATION TRANSMISSION IN WIRELESS TRANSMISSION SYSTEM

CROSS-REFERENCE TO RELATED APPLICATIONS

This application is a 371 U.S. national stage application of International Application No. PCT/KR2009/006725, filed on Nov. 16, 2009, which claims priority to U.S. Provisional Application Ser. Nos. 61/249,977, filed on Oct. 8, 2009, 61/115,113, filed on Nov. 17, 2008, and 61/114,479, filed on Nov. 14, 2008 the contents of which are incorporated by reference herein in their entirety.

BACKGROUND OF THE INVENTION

1. Field of the Invention

The present invention relates to wireless communications, and more particularly, to a method and apparatus for information transmission in a wireless communication system.

2. Related Art

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

A multiple input multiple output (MIMO) scheme is used as a technique for supporting a reliable high-speed data service. The MIMO scheme uses multiple transmit antennas and multiple receive antennas to improve data transmission/reception efficiency. Examples of the MIMO scheme include spatial multiplexing, transmit diversity, beamforming, etc. A MIMO channel matrix depending on the number of receive antennas and the number of transmit antennas can be decomposed into a plurality of independent channels. Each independent channel is referred to as a transmission layer or a stream. The number of transmission layers is referred to as a rank.

Meanwhile, there is an ongoing standardization effort for an international mobile telecommunication-advanced (IMT-A) system aiming at the support of an Internal protocol (IP)-based multimedia seamless service by using a high-speed data transfer rate of 1 gigabits per second (Gbps) in a downlink and 500 megabits per second (Mbps) in an uplink in the international telecommunication union (ITU) as a next generation (i.e., post $3^{rd}$ generation) mobile communication system. A $3^{rd}$ generation partnership project (3GPP) is considering a 3GPP long term evolution-advanced (LTE-A) system as a candidate technique for the IMT-A system. It is expected that the LTE-A system is developed to further complete an LTE system while maintaining backward compatibility with the LTE system. This is because the support of compatibility between the LTE-A system and the LTE system facilitates user convenience. In addition, the compatibility between the two systems is also advantageous from the perspective of service providers since the existing equipment can be reused.

A typical wireless communication system is a single-carrier system supporting one carrier. Since a data transfer rate is in proportion to a transmission bandwidth, the transmission bandwidth needs to increase to support a high-speed data transfer rate. However, except for some areas of the world, it is difficult to allocate frequencies of wide bandwidths. For the effective use of fragmented small bands, a spectrum aggregation technique is being developed. The spectrum aggregation is also referred to as bandwidth aggregation or carrier aggregation. The spectrum aggregation technique is a technique for obtaining the same effect as when a band of a logically wide bandwidth is used by aggregating a plurality of physically non-contiguous bands in a frequency domain. By using the spectrum aggregation technique, multiple carriers can be supported in the wireless communication system. The wireless communication system supporting the multiple carriers is referred to as a multiple-carrier system. The multiple-carrier system is also referred to as a carrier aggregation system. The carrier may also be referred to as other terms, such as, a radio frequency (RF), a component carrier (CC), etc.

For backward compatibility with the IMT system, a bandwidth of carriers used for carrier aggregation can be limited to a bandwidth supported in the IMT system. Carriers of a bandwidth of $\{1.4, 3, 5, 10, 15, 20\}$[ MHz (megahertz)] are supported in 3GPP LTE. Therefore, LTE-A can support a bandwidth greater than 20 MHz by aggregating carriers of the bandwidth supported in the 3GPP LTE. Alternatively, irrespective of the bandwidth supported in the legacy system, a carrier of a new bandwidth can be defined to support carrier aggregation.

Time division multiplexing (TDM), frequency division multiplexing (FDM), code division multiplexing (CDM), or the like can be used as a multiplexing scheme for communication between a base station and each of a plurality of user equipments. The CDM and/or the FDM may be used for simultaneous communication between the base station and each of the plurality of user equipments.

According to the multiplexing scheme, combinations of any one or more of (1) time, (2) frequency, and (3) sequence are used as resources for wireless communication. However, in order to increase an amount of information transmitted at one time, multiple resources can be allocated to a transmitter. In addition, the transmitter to which the multiple resources are allocated can transmit the information through multiple antennas.

Accordingly, there is a need to provide a method of transmitting information by a transmitter by using multiple antennas and multiple resources.

SUMMARY OF THE INVENTION

The present invention provides a method and apparatus for information transmission in a wireless communication system.

In an aspect, a method for information transmission performed by a transmitter in a wireless communication system is provided. The method includes generating a first information sequence based on a first transmission symbol and a first resource index, generating a second information sequence based on a second transmission symbol and a second resource index, generating a third information sequence based on a third transmission symbol and a third resource index, generating a fourth information sequence based on a fourth transmission symbol and a fourth resource index, generating a fifth information sequence based on a fifth transmission symbol and a fifth resource index, generating a sixth information sequence based on a sixth transmission symbol and a sixth resource index, and transmitting the first information sequence, the second information sequence, and the third information sequence through a first antenna, and transmitting the fourth information sequence, the fifth information sequence, and the sixth information sequence through a second antenna.

According to the present invention, an effective information transmission method and apparatus are provided in a wireless communication system. Therefore, an overall system performance can be improved.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. The UTRA is part of a universal mobile telecommunications system (UMTS). 3GPP ($3^{rd}$ Generation, Partnership Project) LTE (Long Term Evolution) is part of an evolved UMTS (E-UMTS) using the E-UTRA, which employs the OFDMA in downlink and the SC-FDMA in uplink. LTE-A (Advanced) is an evolution of 3GPP LTE.

Hereinafter, for clarification, LET-A will be largely described, but the technical concept of the present invention is not meant to be limited thereto.

Figure 1:
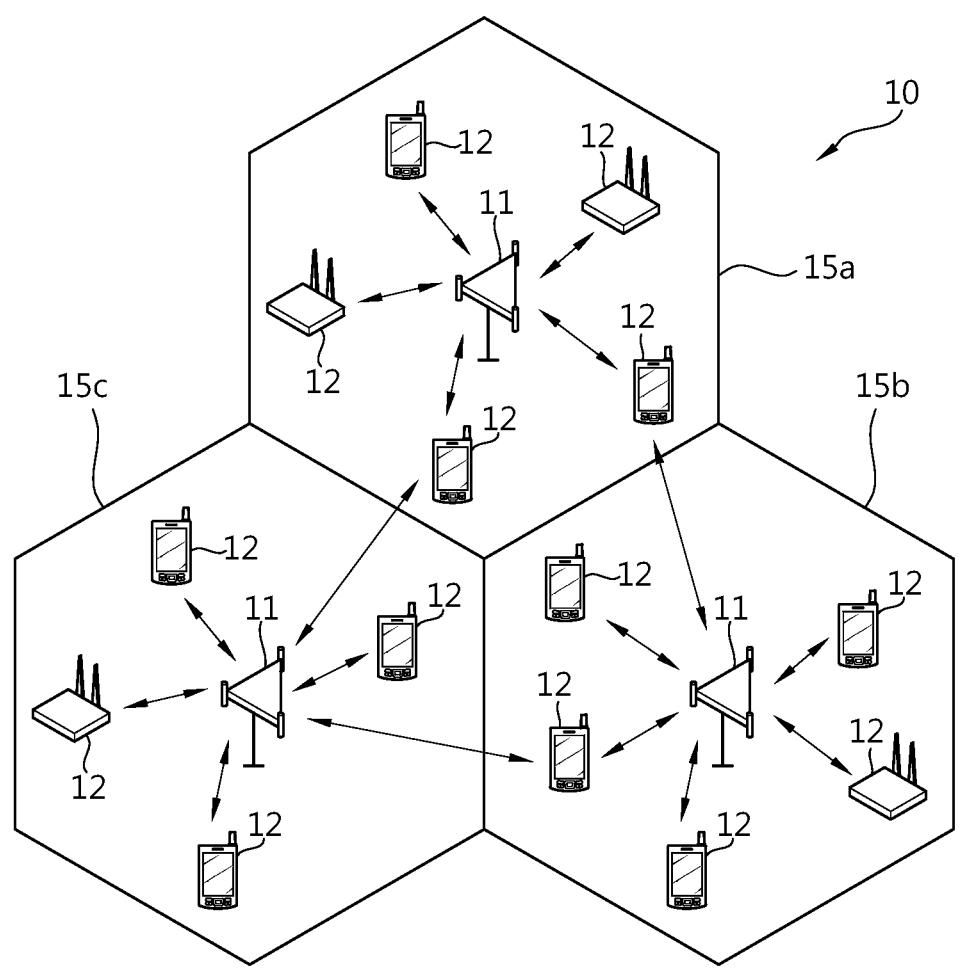
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

A heterogeneous network implies a network in which a relay station, a femto cell and/or a pico cell, and the like are deployed. In the heterogeneous network, the DL may imply communication from the BS to the relay station, the femto cell, or the pico cell. Further, the DL may also imply communication from the relay station to the UE. Furthermore, in case of multi-hop relay, the DL may imply communication from a first relay station to a second relay station. In the heterogeneous network, the UL may imply communication from the relay station, the femto cell, or the pico cell to the BS. Further, the UL may also imply communication from the UE to the relay station. Furthermore, in case of multi-hop relay, the UL may imply communication from the second relay station to the first relay station.

The wireless communication system can support multiple antennas. The transmitter may use a plurality of transmit (Tx) antennas, and the receiver may use a plurality of receive (Rx) antennas. The Tx antenna denotes a physical or logical antenna used for transmission of one signal or stream. The Rx antenna denotes a physical or logical antenna used for reception of one signal or stream. When the transmitter and the receiver use a plurality of antennas, the wireless communication system may be referred to as a multiple input multiple output (MIMO) system.

The wireless communication system can support UL and/or DL hybrid automatic repeat request (HARQ). In addition, a channel quality indicator (CQI) can be used for link adaptation.

A wireless communication process is preferably implemented with a plurality of independent hierarchical layers rather than one single layer. A structure of a plurality of hierarchical layers is referred to as a protocol stack. The protocol stack may refer to an open system interconnection (OSI) model which is a widely known protocol for communication systems.

Figure 2:
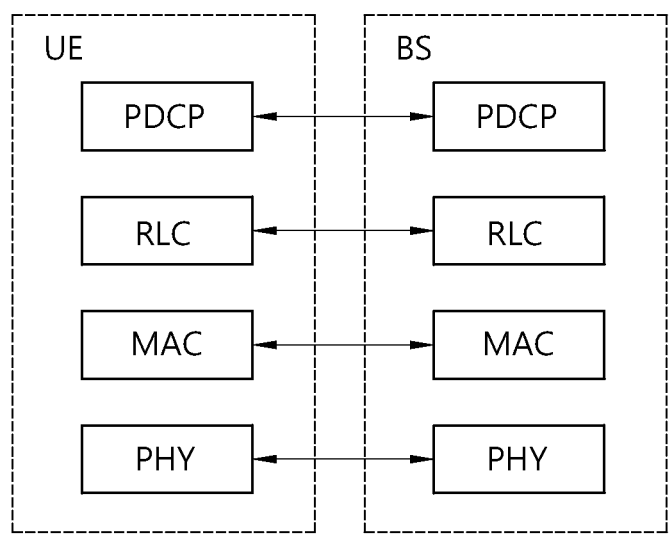
FIG. 2 is a diagram showing a radio protocol architecture for a user plane.
Figure 3:
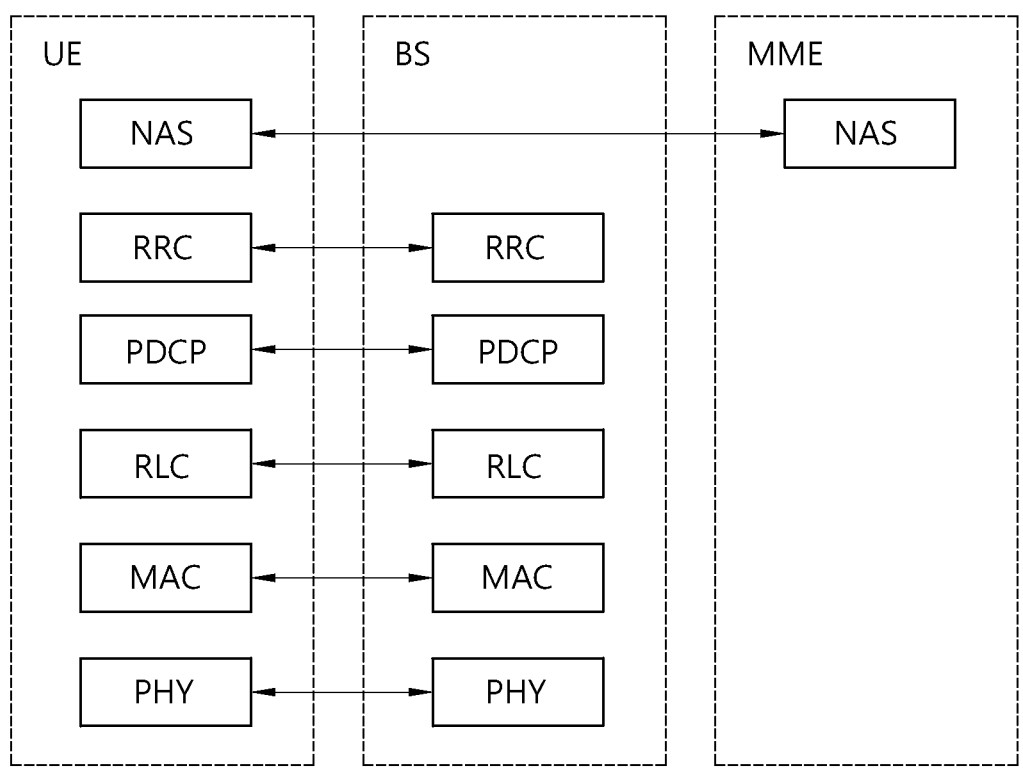
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, between different physical (PHY) layers (i.e., a PHY layer of a transmitter and a PHY layer of a receiver), data is transferred through a physical channel. The PHY layer is also referred to as a layer 1 (L1). The PHY layer is coupled with a medium access control (MAC) layer, i.e., an upper layer of the PHY layer, through a transport channel. Between the MAC layer and the PHY layer, data is transferred through the transport channel. The PHY layer provides the MAC layer and an upper layer with an information transfer service through the transport channel.

The MAC layer provides services to a radio link control (RLC) layer, i.e., an upper layer of the MAC layer, through a logical channel. The RLC layer supports reliable data transmission. A packet data convergence protocol (PDCP) layer performs a header compression function to reduce a header size of an Internet protocol (IP) packet. The MAC layer, the RLC layer, and the PDCP layer are also referred to as a layer 2 (L2).

A radio resource control (RRC) layer is defined only in the control plane. The RRC layer is also referred to as a layer 3 (L3). The RRC layer controls radio resources between a UE and a network. For this, in the RRC layer, RRC messages are exchanged between the UE and the network. The RRC layer serves to control the logical channel, the transport channel, and the physical channel in association with configuration, reconfiguration and release of radio bearers. The radio bearer represents a logical path provided by the L1 and the L2 for data transmission between the UE and the network. Configuration of the radio bearer implies a process for defining characteristics of a radio protocol layer and channel to provide a specific service, and for configuring respective specific parameters and operation mechanisms. The radio bearer can be classified into a signaling radio bearer (SRB) and a data radio bearer (DRB). The SRB is used as a path for transmitting an RRC message in the control plane, and the DRB is used as a path for transmitting user data in the user plane. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 4:
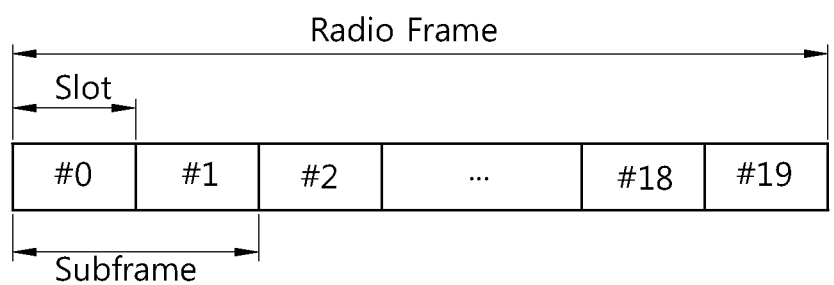
FIG. 4 shows a structure of a radio frame.

FIG. 4 shows a structure of a radio frame.

Referring to FIG. 4, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 4 is shown for exemplary purposes only. Thus, the number of subframes included in the radio frame or the number of slots included in the subframe may change variously.

Figure 5:
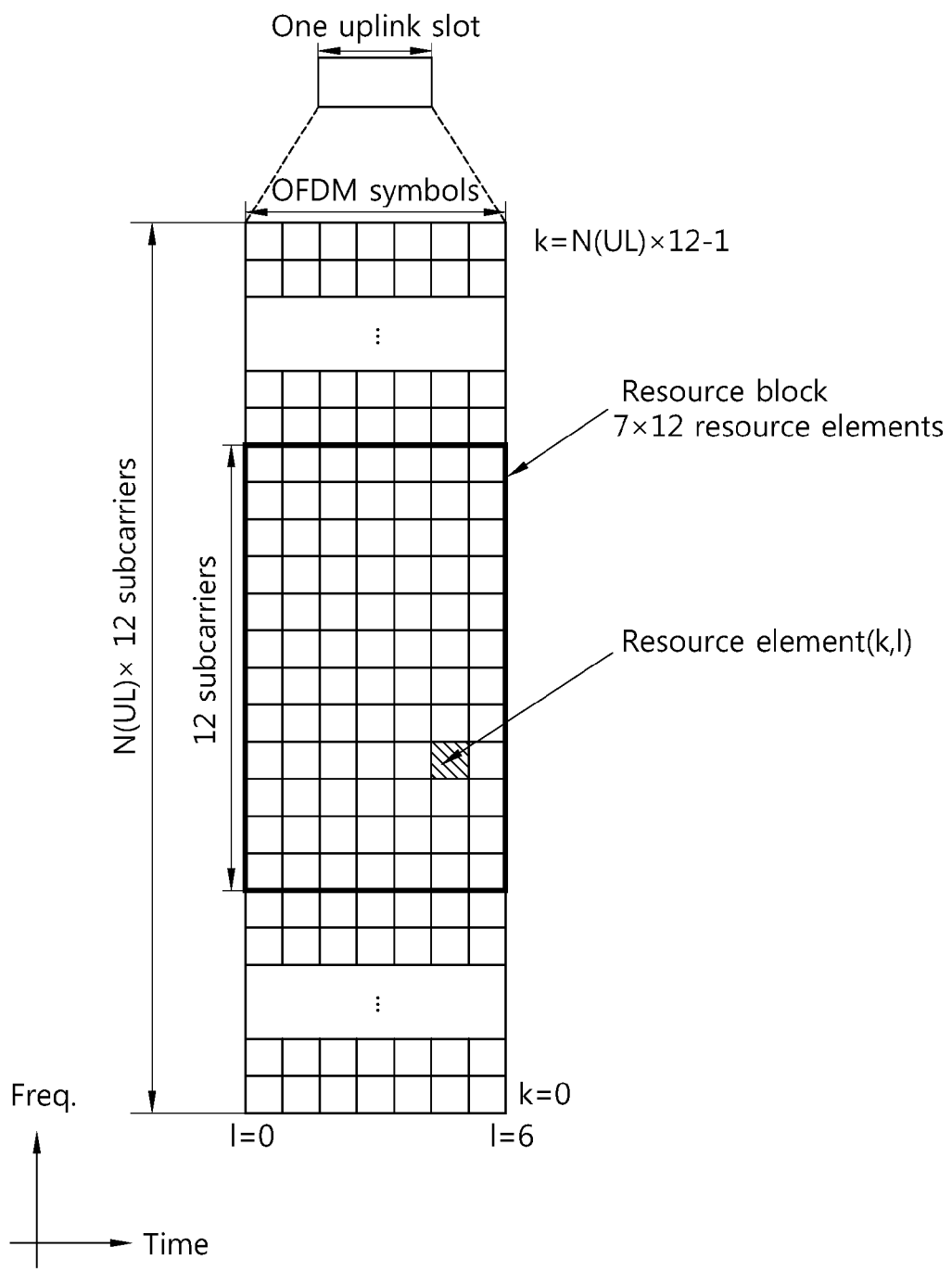
FIG. 5 shows an example of a resource grid for one UL slot.

FIG. 5 shows an example of a resource grid for one UL slot.

Referring to FIG. 5, the UL slot includes a plurality of orthogonal frequency division multiplexing (OFDM) symbols in a time domain and includes N(UL) resource blocks (RBs) in a frequency domain. The OFDM symbol represents one symbol period, and may also be referred to as other terms such as an OFDMA symbol, an SC-FDMA symbol, or the like according to a multiple access scheme. The number N(UL) of RBs included in the UL slot depends on a UL transmission bandwidth determined in a cell. One RB includes a plurality of subcarriers in the frequency domain.

Each element on the resource grid is referred to as a resource element (RE). The RE on the resource grid can be identified by an index pair (k, I) in a slot. Herein, k(k= 0, . . . , N(UL)×12−1) denotes a subcarrier index in the frequency domain, and I(I=0, . . . , 6) denotes a symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6.

The resource grid for one UL slot of FIG. 5 can also be applied to a resource grid for a DL slot.

Figure 6:
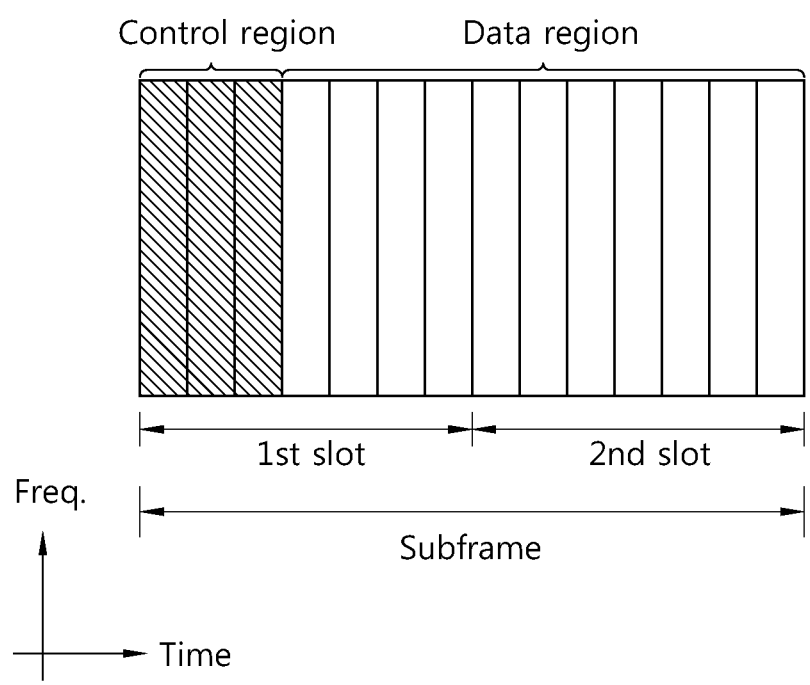
FIG. 6 shows a structure of a DL subframe.

FIG. 6 shows a structure of a DL subframe.

Referring to FIG. 6, the DL subframe includes two consecutive slots. First 3 OFDM symbols of a $1^{st}$ slot included in the DL subframe correspond to a control region, and the remaining OFDM symbols correspond to a data region. Herein, the control region includes 3 OFDM symbols for exemplary purposes only.

A physical downlink shared channel (PDSCH) may be allocated to the data region. DL data is transmitted through the PDSCH. The DL data may be a transport block which is a data block for a downlink shared channel (DL-SCH), i.e., a transport channel transmitted during TTI. A BS may transmit the DL data to a UE through one antenna or multiple antennas. In 3GPP LTE, the BS may transmit one codeword to the UE through one antenna or multiple antennas, or may transmit two codewords through multiple antennas. The 3GPP LTE supports up to 2 codewords. The codewords are encoded bits in which channel coding is performed on an information bit corresponding to information. Modulation can be performed for each codeword.

A control channel may be allocated to the control region. Examples of the control channel include a physical control format indicator channel (PCFICH), a physical hybrid automatic repeat request (HARQ) indicator channel (PHICH), a physical downlink control channel (PDCCH), etc.

The PCFICH carries information indicating the number of OFDM symbols used for transmission of PDCCHs in a subframe to the UE. The number of OFDM symbols used for PDCCH transmission may change in every subframe. In the subframe, the number of OFDM symbols used for PDCCH transmission may be any one value among 1, 2, and 3. If a DL transmission bandwidth is less than a specific threshold, the number of OFDM symbols used for PDCCH transmission in the subframe may be any one value among 2, 3, and 4.

The PHICH carries HARQ acknowledgement (ACK)/negative acknowledgement (NACK) for UL data.

The control region consists of a set of a plurality of control channel elements (CCEs). If a total number of CCEs constituting a CCE set is N(CCE) in the DL subframe, the CCEs are indexed from 0 to N(CCE)−1. The CCEs correspond to a plurality of resource elements groups. The resource element group is used to define mapping of the control channel to a resource element. One resource element group consists of a plurality of resource elements. A PDCCH is transmitted through an aggregation of one or several contiguous CCEs. A plurality of PDCCHs may be transmitted in the control region. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of $\{1, 2, 4, 8\}$.

The PDCCH carries DL control information. Examples of the DL control information include DL scheduling information, UL scheduling information, a UL power control command, etc. The DL scheduling information is also referred to as a DL grant. The UL scheduling information is also referred to as a UL grant.

The BS does not provide the UE with information indicating where a PDCCH of the UE is located in the subframe. In general, in a state where the UE does not know a location of the PDCCH of the UE in the subframe, the UE finds the PDCCH of the UE by monitoring a set of PDCCH candidates in every subframe. Monitoring implies that the UE attempts to perform decoding for each of the PDCCH candidates according to all possible DCI formats. This is referred to as blind decoding or blind detection.

For example, when the BS transmits the DL data to the UE through a PDSCH within a subframe, the BS carries a DL grant used for scheduling of the PDSCH through a PDCCH within the subframe. The UE can first detect the PDCCH for transmitting the DL grant through blind decoding. The UE can read the DL data transmitted through the PDSCH based on the DL grant.

Figure 7:
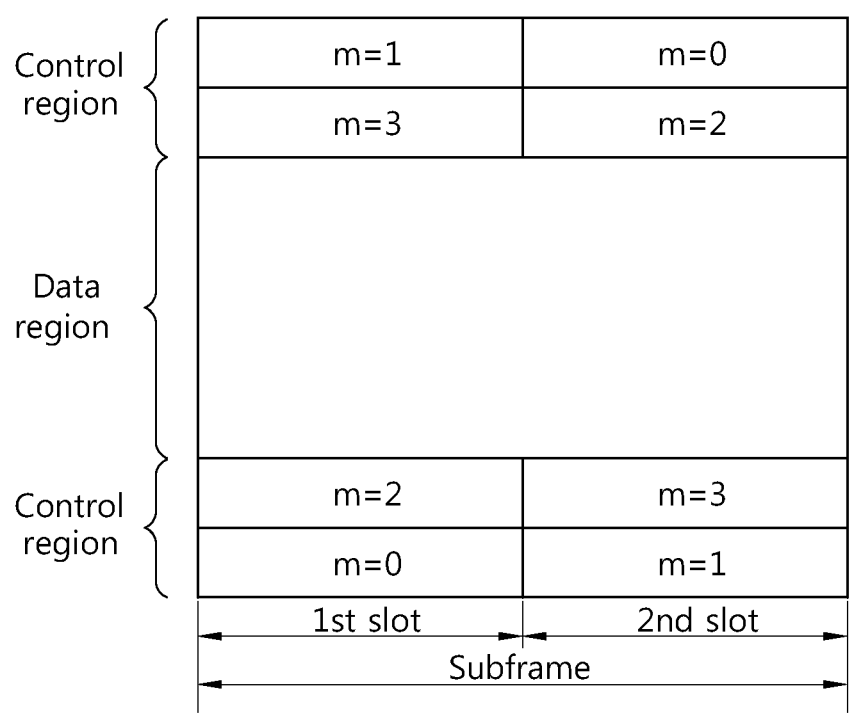
FIG. 7 shows an exemplary structure of a UL subframe.
Figure 7:
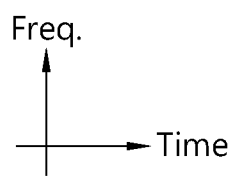

FIG. 7 shows an exemplary structure of a UL subframe.

Referring to FIG. 7, the UL subframe can be divided into a control region and a data region. A physical uplink control channel (PUCCH) for carrying UL control information is allocated to the control region. A physical uplink shared channel (PUSCH) for carrying user data is allocated to the data region. In 3GPP LTE (Release 8), resource blocks allocated to one UE are contiguous in a frequency domain to maintain a single-carrier property. One UE cannot transmit the PUCCH and the PUSCH concurrently. Concurrent transmission of the PUCCH and the PUSCH is under consideration In LTE-A (Release 10).

The PUCCH for one UE is allocated in a resource block (RB) pair in the subframe. RBs belonging to the RB pair occupy different subcarriers in each of $1^{st}$ and $2^{nd}$ slots. A frequency occupied by the RBs belonging to the RB pair to be allocated to the PUCCH is changed on a slot boundary basis. That is, RBs allocated to the PUCCH are hopped in a slot level. Hereinafter, hopping of the RB in the slot level is called frequency hopping. A frequency diversity gain is obtained when the UE transmits UL control information through a frequency located at different positions over time. In FIG. 7, m is a location index indicating a frequency-domain location of the RB pair allocated to the PUCCH within the subframe.

The PUSCH is mapped to an uplink shared channel (UL-SCH) which is a transport channel. Examples of UL control information transmitted through the PUCCH include HARQ ACK/NACK, a channel quality indicator (CQI) indicating a DL channel state, a scheduling request (SR) as a request for UL radio resource allocation, etc. Hereinafter, the CQI is the concept including a precoding matrix indicator (PMI) and a rank indicator (RI) in addition to the CQI. The concept including the CQI, the PMI, and the RI is also called channel state information (CSI).

Time division multiplexing (TDM), frequency division multiplexing (FDM), code division multiplexing (CDM), or the like can be used as a multiplexing scheme for communication between a BS and each of a plurality of UEs. The CDM and/or the FDM may be used for simultaneous communication between the BS and each of the plurality of UEs.

Multiplexing schemes based on an orthogonal sequence or a quasi-orthogonal sequence are collectively referred to as the CDM. That is, sequences used for the CDM are not necessarily orthogonal to each other. Sequences having a low correlation may also be used for the CDM.

Hereinafter, a method and apparatus for information transmission will be described when CDM and/or FDM are used as a multiplexing scheme.

When the CDM and/or the FDM are used as the multiplexing scheme, a resource used for information transmission is a sequence and/or a frequency resource. For example, when only the CDM is used as the multiplexing scheme, the resource is the sequence, and when the CDM and the FDM are used together, the resource is the sequence and the frequency resource. Hereinafter, the frequency resource and the sequence will be described in detail.

(1) Frequency Resource

The aforementioned resource block is an example of the frequency resource. This is because the frequency resource differs when the resource block differs within the same time period. Hereinafter, for convenience of explanation, the resource block is used in the concept of a normal frequency resource.

(2) Sequence

The sequence is not particularly limited, and thus may be any sequence.

For example, the sequence may be selected from a sequence set having a plurality of sequences as its elements. The plurality of sequences included in the sequence set may be orthogonal to each other, or may have a low correlation with each other. For convenience of explanation, it is assumed that the plurality of sequences included in the sequence set are orthogonal to each other. Hereinafter, the sequence set is an orthogonal sequence set consisting of orthogonal sequences. Each of the orthogonal sequences belonging to the orthogonal sequence set corresponds to one orthogonal sequence index in a one-to-one manner.

The orthogonal sequence set having length-4 orthogonal sequences as its elements may use a Walsh-Hadamard matrix.

Table 1 below shows an example of an orthogonal sequence set consisting of an orthogonal sequence w(k, Ios) having a length of K=4 (Ios denotes an orthogonal sequence index and k denotes an element index of the orthogonal sequence, where $0 \leq k \leq K-1$).

TABLE 1

| Orthogonal sequence index | [w(0), w(1), w(2), w(3)] |
|---|---|
| 0 | [+1 +1 +1 +1] |
| 1 | [+1 −1 +1 −1] |
| 2 | [+1 +1 −1 −1] |
| 3 | [+1 −1 −1 +1] |

The orthogonal sequence set may consist of only some orthogonal sequences of Table 1 above. In 3GPP LTE, three orthogonal sequences are used except for [+1, +1, −1, −1].

Table 2 below shows an example of an orthogonal sequence set consisting of an orthogonal sequence w(k, Ios) having a length of K=3 (Ios denotes an orthogonal sequence index and k denotes an element index of the orthogonal sequence, where $0 \leq k \leq K-1$).

TABLE 2

| Orthogonal sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 3 below shows an example of an orthogonal sequence set consisting of an orthogonal sequence w(k, Ios) having a length of K=2 (Ios denotes an orthogonal sequence index and k denotes an element index of the orthogonal sequence, where $0 \leq k \leq K-1$).

TABLE 3

| Orthogonal sequence index | [w(0), w(1)] |
|---|---|
| 0 | [1 1] |
| 1 | [1 −1] |

For another example, a cyclically shifted sequence may be used as the sequence. The cyclically shifted sequence can be generated by cyclically shifting a base sequence by a specific cyclic shift (CS) amount. Various types of sequences can be used as the base sequence. For example, a well-known sequence such as a pseudo noise (PN) sequence and a Zadoff-Chu (ZC) sequence can be used as the base sequence. Alternatively, a computed generated constant amplitude zero auto-correlation (CAZAC) sequence may be used. Equation 1 below shows an example of the base sequence.

$$r_i(n) = e^{jb(n)\pi/4} \quad \text{[Equation 1]}$$

Herein, $i \in \{0, 1, \ldots, 29\}$ denotes a root index, and n denotes a component index in the range of $0 \leq n \leq N-1$, where N is a sequence length. i can be determined by a cell identifier (ID), a slot number in a radio frame, etc. When one resource block includes 12 subcarriers, N can be set to 12. A different base sequence is defined according to a different root index. When N=12, b(n) can be defined by Table 4 below.

TABLE 4

| i | b(0), . . . , b(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

The base sequence r(n) can be cyclically shifted according to Equation 2 below to generate a cyclically shifted sequence r(n, Ics).

$$r(n, I_{cs}) = r(n) \cdot \exp\left(\frac{j2\pi I_{cs} n}{N}\right), \quad \text{[Equation 2]}$$

$$0 \leq I_{cs} \leq N - 1$$

In Equation 2, Ics denotes a CS index indicating a CS amount ($0 \leq \text{Ics} \leq N-1$, where Ics is an integer).

Hereinafter, an available CS index of the base sequence denotes a CS index that can be derived from the base sequence according to a CS interval. For example, if a length of the base sequence is 12 and the CS interval is 1, a total number of available CS indices of the base sequence is 12. Alternatively, if a length of the base sequence is 12 and the CS interval is 2, a total number of available CS indices of the base sequence is 6. The CS interval can be determined by considering a delay spread.

Figure 8:
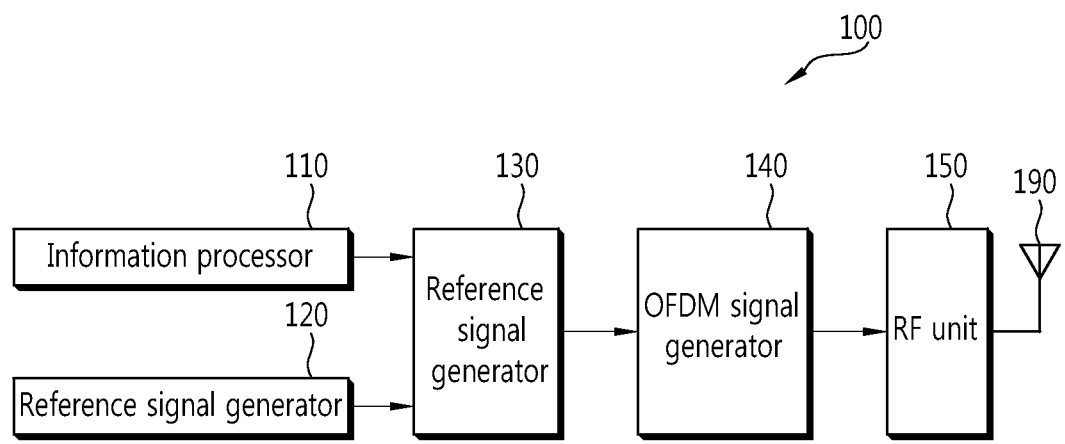
FIG. 8 is a block diagram showing an exemplary structure of a transmitter. Herein, the transmitter may be a part of a UE or a BS.

FIG. 8 is a block diagram showing an exemplary structure of a transmitter. Herein, the transmitter may be a part of a UE or a BS.

Referring to FIG. 8, a transmitter 100 includes an information processor 110, a reference signal generator 120, a resource block mapper 130, an OFDM signal generator 140, a radio frequency (RF) unit 150, and an antenna 190.

The information processor 110 and the reference signal generator 120 are connected to the resource block mapper 130. The resource block mapper 130 is connected to the OFDM signal generator 140. The OFDM signal generator 140 is connected to the RF unit 150. The RF unit 150 is connected to the antenna 190.

Information is input to the information processor 110. Examples of the information include user data, control information, mixed information of several pieces of control information, multiplexed information of the control information and the user data, etc. The information may have a bit or bit-stream format. The transmitter 100 can be implemented in a physical layer. In this case, the information may be derived from a higher layer such as a MAC layer.

The information processor 110 is configured to generate an information sequence based on information or a sequence. The information sequence consists of a plurality of information sequence elements.

The reference signal generator 120 generates a reference signal sequence. The reference signal sequence consists of a plurality of reference signal elements. The reference signal sequence can also be referred to as a reference signal (RS). The RS is a signal which is known to both a transmitter and a receiver. The RS can be used for information demodulation in the receiver. Any sequence can be used as the RS sequence without a particular restriction.

The resource block mapper 130 is configured to map the information sequence and the RS sequence to a resource block allocated for information transmission. One information sequence element or one RS sequence element can be mapped to one resource element. '0' may be inserted to a resource element to which the information sequence and the RS sequence are not mapped. Since CDM is used, multiplexing can be achieved to the same resource block. Of course, FDM can be used together with the CDM, and thus multiplexing can be achieved by different resource blocks.

The resource block may be a physical resource block or a virtual resource block. The physical resource block includes subcarriers physically located in a frequency domain. The virtual resource block includes subcarriers physically distributed in the frequency domain. There is no particular restriction on a distribution scheme of subcarriers included in the virtual resource block.

For information transmission, one or more resource blocks may be allocated to the transmitter 100. When a plurality of resource blocks are allocated, the plurality of resource blocks may be allocated either continuously or discontinuously. When the information sequence and the RS sequence are mapped to subcarriers in a localized mapping type or a distributed mapping type, a single-carrier property is maintained. The localized mapping type is that the information sequence and the RS sequence are mapped to subcarriers physically contiguous in the frequency domain. The distributed mapping type is that the information sequence and the RS sequence are mapped to subcarriers distributed equidistantly. In 3GPP LTE, the localized mapping type is used in UL transmission.

The resource block includes an information part and an RS part. The information sequence is mapped to the information part, and the RS sequence is mapped to the RS part.

The RS part and the information part may use different OFDM symbols within a resource block. Alternatively, the RS part and the information part may use different subcarriers within an OFDM symbol.

For convenience of explanation, it is assumed hereinafter that the RS part and the information part use different OFDM symbols within the resource block. One or more OFDM symbols within the resource block may be the RS part. When a plurality of OFDM symbols within the resource block is the RS part, the plurality of OFDM symbols may be contiguous to each other or may be non-contiguous to each other. The position and number of OFDM symbols used as the RS part within the resource block may vary without a particular restriction. An OFDM symbol within the resource block except for the RS part may be used as the information part.

For example, it is assumed that the transmitter is a part of a UE, and transmits information through a PUCCH. The resource block mapper 130 maps the information sequence and the RS sequence to a resource block pair (see FIG. 7) within a subframe allocated for PUCCH transmission.

The OFDM signal generator 140 is configured to generate a time-continuous OFDM signal in every OFDM symbol within the resource block. The time-continuous OFDM signal is also referred to as an OFDM baseband signal. The OFDM signal generator 140 can generate an OFDM signal by performing an inverse fast Fourier transform (IFFT) operation, CP insertion, or the like for each OFDM symbol.

The RF unit 150 converts the OFDM baseband signal to a radio signal. The OFDM baseband signal can be converted to the radio signal by being up-converted to a carrier frequency. The carrier frequency is also referred to as a center frequency. The radio signal is transmitted through the antenna 190.

The transmitter 100 can support both a single-carrier system and a multiple-carrier system. When supporting the multiple-carrier system, the transmitter 100 may include the information processor 110, the reference signal generator 120, the resource block mapper 130, the OFDM signal generator 140, or the RF unit 150 for each carrier.

Hereinafter, the OFDM signal can use not only OFDMA but also SC-FDMA and clustered SC-FDMA which is modification of SC-FDMA, N×SC-FDMA, or the like as a multiple access scheme.

The SC-FDMA is also referred to as DFT spread-OFDM (DFTs-OFDM) since IFFT is performed on DFT-spread complex-valued symbols. In the SC-FDMA, a peak-to-average power ration (PAPR) or a cubic metric (CM) may be decreased. When using the SC-FDMA transmission scheme, transmission power efficiency may be increased in a UE of which power consumption is limited. Accordingly, a user throughput can be increased.

The clustered SC-FDMA is a method in which the DFT-spread complex-valued symbols are divided into a plurality of subblocks, and the plurality of subblocks are mapped to subcarriers by being distributed in a frequency domain. This is also referred to as clustered DFTs-OFDM. The clustered SC-FDMA is applicable to both the single-carrier system and the multiple-carrier system. In the multiple-carrier system, one subblock may correspond to one subcarrier. When carriers are continuously allocated in the multiple-carrier system, and a subcarrier spacing is aligned between consecutive carriers, then the transmitter 100 may include one OFDM signal generator 140 and one antenna 190. When the carriers are allocated non-continuously and the subcarrier spacing is not aligned between the contiguous carriers, the transmitter 100 may include the OFDM signal generator 140 and the RF unit 150 for each carrier.

The N×SC-FDMA is a method in which a codeblock is divided into a plurality of chunks and DFT and IFFT are performed on a chunk basis. This is also referred to as chunk specific DFTs-OFDM. The transmitter 100 may include the information processor 110, the reference signal generator 120, the resource block mapper 130, the OFDM signal generator 140, and the RF unit 150 for each carrier. The N×SC-FDMA is applicable to both continuous carrier allocation and non-contiguous carrier allocation.

Figure 9:
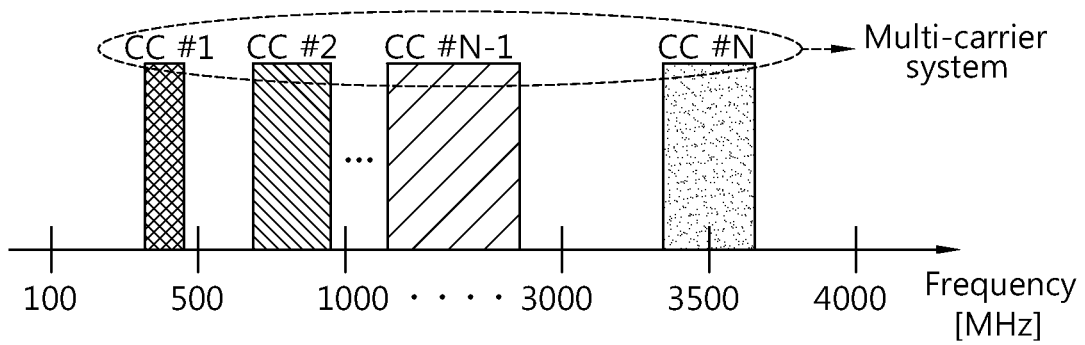
FIG. 9 shows an example of a plurality of carriers used in a multiple-carrier system.

FIG. 9 shows an example of a plurality of carriers used in a multiple-carrier system.

Referring to FIG. 9, the multiple-carrier system may use N carriers, i.e., CC #1, CC #2, ..., CC #N. It is shown herein that adjacent carriers are physically discontiguous in a frequency domain. However, this is for exemplary purposes only, and thus the adjacent carriers may be physically contiguous in the frequency domain. Therefore, the multiple-carrier system may use a frequency of a logically large bandwidth (BW) by aggregating a plurality of carriers physically contiguous and/or non-contiguous in the frequency domain.

In the multiple-carrier system, a physical layer can be implemented per carrier. Alternatively, one physical layer can be implemented for a plurality of carriers. In this case, one physical layer may manage or operate the plurality of carriers. A MAC layer may also be implemented per carrier, or one MAC layer may be implemented for a plurality of carriers. Carriers managed by one MAC layer are not necessarily contiguous to each other. When one MAC layer manages and operates the plurality of carriers, there is an advantage in that resource management is flexible.

When the multiple-carrier system uses a time division duplex (TDD) scheme, DL transmission and UL transmission can be included in each carrier. When the multiple-carrier system uses a frequency division duplex (FDD) scheme, carriers can be used by being divided into a DL carrier and a UL carrier. In this case, a plurality of DL carriers and a plurality of UL carriers can be supported. A BS may allocate one or more DL carriers or one or more UL carriers to a UE. In the multiple-carrier system, the BS may transmit information to one UE simultaneously through one or more carriers. The UE also may transmit information to the BS simultaneously through one or more carriers.

The multiple-carrier system can be classified into a symmetrical structure and an asymmetrical structure. The symmetrical structure is a case where the number of DL carriers is equal to the number of UL carriers. The asymmetrical structure is a case where the number of DL carriers is different from the number of UL carriers. A case where a bandwidth of the DL carrier is different from a bandwidth of a UL carrier can also be considered as the asymmetrical structure.

Figure 10:
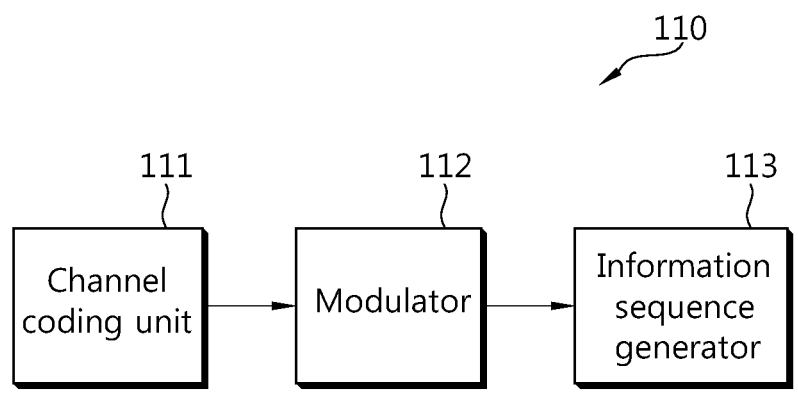
FIG. 10 is a block diagram showing an exemplary structure of an information process included in a transmitter.

FIG. 10 is a block diagram showing an exemplary structure of an information process included in a transmitter.

Referring to FIG. 10, an information processor 110 includes a channel coding unit 111, a modulator 112, and an information sequence generator 113.

An information bit corresponding to information to be transmitted by the transmitter is input to the channel coding unit 111. The channel coding unit 111 performs channel coding on the information bit to generate an encoded bit. There is no restriction on a channel coding scheme. Examples of the channel coding scheme include turbo coding, convolution coding, block coding, etc. The block code may be a Reed-Muller code family. A size of the encoded bit output from the channel coding unit 111 may be various.

The channel coding unit 111 may perform rate matching on the encoded bit to generate a rate-matched bit. Hereinafter, the encoded bit may represent the rate-matched bit.

The modulator 112 maps the encoded bit to a symbol that expresses a position on a signal constellation to generate a modulation symbol. There is no restriction on a modulation scheme. Examples of the modulation scheme include m-phase shift keying (m-PSK), m-quadrature amplitude modulation (m-QAM), etc. One or a plurality of modulation symbols can be provided. The number of modulation symbols may be various according to the size of the encoded bit input to the modulator 112 and the modulation scheme.

The information processor 110 may (or may not) perform discrete Fourier transform (DFT) on the modulation symbol. In 3GPP LTE, DFT is not performed when information is transmitted through a PUCCH, and is performed when information is transmitted through a PUSCH. When performing DFT, the information processor 110 may further include a DFT unit (not shown) for outputting a complex-valued symbol by performing DFT on the modulation symbol. It is assumed herein that a modulation symbol on which DFT is not performed is input to the information sequence generator 113.

The information sequence generator 113 generates an information sequence based on an information symbol or sequence. Hereinafter, one or a plurality of complex-valued symbols input to the information sequence generator 113 are collectively referred to as the information symbol. The information symbol represents one or a plurality of normal complex-valued symbols corresponding to information to be transmitted by the information processor 110. For example, the information symbol may be a modulation symbol, a complex-valued symbol on which DFT is performed on the modulation symbol, any signal, a complex-valued signal, a spread symbol obtained after spreading the modulation symbol, or the like. The information sequence may be a one-dimensional spread sequence or a two-dimensional spread sequence.

(1) One-Dimensional Spread Sequence

The one-dimensional spread sequence is generated based on a modulation symbol and a $1^{st}$ sequence. One modulation symbol or each of a plurality of modulation symbols may be multiplied by the $1^{st}$ sequence to generate the one-dimensional spread sequence.

Equation 3 below shows an example of generating K one-dimensional spread sequences s(n) based on modulation symbols d(0), ..., d(K−1) and a $1^{st}$ sequence x(n) with a length N (K and N are natural numbers, and n is an element index of the $1^{st}$ sequence, where $0 \leq n \leq N-1$).

$$s(n)=d(k)x(n), 0 \leq k \leq K-1 \qquad \text{[Equation 3]}$$

In Equation 3, the modulation symbols d(0), ..., d(K−1) may be K modulation symbols. Alternatively, one modulation symbol d(0) may be repetitively used K times.

The one-dimensional spread sequence s(n) is mapped to a time domain or a frequency domain. When it is mapped to the time domain, the one-dimensional spread sequence s(n) may be mapped to time samples, chips, or OFDM symbols. When it is mapped to the frequency domain, the one-dimensional spread sequence s(n) may be mapped to subcarriers.

Hereinafter, when the one-dimensional spread sequence s(n) is mapped to the time domain, the $1^{st}$ sequence x(n) is called a time-domain sequence. When the one-dimensional spread sequence s(n) is mapped to the frequency domain, the $1^{st}$ sequence x(n) is called a frequency-domain sequence.

(2) Two-Dimensional Spread Sequence

The two-dimensional spread sequence is generated based on the one-dimensional spread sequence and a $2^{nd}$ sequence. That is, the two-dimensional spread sequence is generated based on the modulation symbol, the $1^{st}$ sequence, and the $2^{nd}$ sequence. The one-dimensional spread sequence may be spread to the $2^{nd}$ sequence to generate the two-dimensional spread sequence.

Equation 4 below shows an example of generating a two-dimensional spread sequence z(n,k) by spreading K one-dimensional spread sequences s(n) to a $2^{nd}$ sequence y(k) (k is an element index of the $2^{nd}$ sequence, where $0 \leq k \leq K-1$).

$$z(n,k)=w(k)y(n)=w(k)d(k)x(n) \qquad \text{[Equation 4]}$$

The two-dimensional spread sequence z(n,k) is mapped to the time domain or the frequency domain. For example, n may correspond to a subcarrier index, and k may correspond to a symbol index. Alternatively, n may correspond to a symbol index, and k may correspond to a subcarrier index.

An RS sequence may be generated similarly to generation of an information sequence. When the information sequence is the one-dimensional spread sequence, the $1^{st}$ sequence for an RS may be used as the RS sequence. If the information sequence is the two-dimensional spread sequence, the RS sequence may be generated based on the $1^{st}$ sequence for the RS and the $2^{nd}$ sequence for the RS.

As such, to perform information transmission, the transmitter 100 has to determine a resource used for information transmission. The resource may consist of at least one of (1) the $1^{st}$ sequence, (2) the $2^{nd}$ sequence, and (3) resource blocks. For example, the $1^{st}$ sequence may be a cyclic shifted sequence, and the $2^{nd}$ sequence may be an orthogonal sequence.

A resource index identifies the resource used for information transmission. Therefore, the resource is determined from the resource index. Each of sequences used to generate the information sequence and the RS sequence is determined from the resource index. In addition, a resource block to which the information sequence and the RS sequence are mapped can be determined from the resource index.

Therefore, the transmitter 100 has to obtain the resource index to perform information transmission. When the transmitter is a part of a BS, the transmitter may determine the resource index through scheduling.

When the transmitter is a part of a UE, a method of obtaining the resource index of the UE is problematic. The BS may report the resource index to the UE explicitly or implicitly. In addition, the resource index may change semi-statically or dynamically.

For example, the resource index may be determined by higher layer signaling. The higher layer may be an RRC layer. In this case, the resource index changes semi-statically. Information to be transmitted by the UE may be SR, semi-persistent scheduling (SPS) ACK/NACK, CQI, etc. The SPS ACK/NACK is HARQ ACK/NACK for DL data transmitted through semi-static scheduling. When the DL data is transmitted through a PDSCH, a PDCCH corresponding to the PDSCH may not exist.

For another example, the UE may obtain the resource index from a radio resource by which a control channel for receiving the DL data is transmitted. In this case, information transmitted by the UE may be dynamic ACK/NACK. The dynamic ACK/NACK is ACK/NACK for DL data transmitted through dynamic scheduling. In the dynamic scheduling, the BS transmits a DL grant to the UE every time through a PDCCH whenever DL data is transmitted through the PDSCH.

Equation 5 below shows an example of determining a resource index R for dynamic ACK/NACK transmission.

$$R=n(CCE)+N(PUCCH) \quad \text{[Equation 5]}$$

In Equation 5, n(CCE) denotes a $1^{st}$ CCE index used for PDCCH transmission with respect to a PDSCH, and N(PUCCH) denotes the number of resource indices allocated for SR and SPS ACK/NACK. N(PUCCH) is a cell-specific parameter, and can be determined by a higher layer such as an RRC layer.

Therefore, the BS can regulate a resource for ACK/NACK transmission by controlling the $1^{st}$ CCE index used for PDCCH transmission.

As an example of an information transmission method based on CDM and FDM, there is a method transmitting UL control information through a PUCCH. Hereinafter, the method of transmitting the UL control information through the PUCCH will be described.

The PUCCH can support multiple formats. That is, it is possible to transmit the UL control signal whose number of bits per subframe differs according to the modulation scheme. Table 5 below shows an example of a modulation scheme and the number of bits per subframe based on a PUCCH format.

TABLE 5

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to transmit the SR. The PUCCH format 1a/1b is used to transmit the HARQ ACK/NACK signal. The PUCCH format 2 is used to transmit the CQI. The PUCCH format 2a/2b is used to transmit the CQI and the HARQ ACK/NACK signal.

In any subframe, if the HARQ ACK/NACK signal is transmitted alone, the PUCCH format 1a/1b is used, and if the SR is transmitted alone, the PUCCH format 1 is used. The UE can transmit the HARQ ACK/NACK signal and the SR simultaneously in the same subframe. For positive SR transmission, the UE transmits the HARQ ACK/NACK signal by using a PUCCH allocated for the SR. For negative SR transmission, the UE transmits the HARQ ACK/NACK signal by using a PUCCH resource allocated for the ACK/NACK.

In case of the PUCCH format 1a, an ACK/NACK bit (one bit) is output from a channel coding unit. For example, each ACK may be coded to a binary '1', and each NACK may be coded to a binary '0'. In case of the PUCCH format 1b, ACK/NACK bits (two bits) b(0) and b(1) may be output from the channel coding unit. b(0) may correspond to an ACK/NACK bit for a $1^{st}$ codeword, and b(1) may correspond to an ACK/NACK bit for a $2^{nd}$ codeword. That is, the PUCCH format 1a is for HARQ ACK/NACK information for the $1^{st}$ codeword, and the PUCCH format 1b is for HARQ ACK/NACK information of the $2^{nd}$ codeword.

Each of the PUCCH formats 1, 1a, and 1b uses one complex-valued symbol d(0). The BS can detect an SR by only determining whether there is PUCCH format 1 transmission from the UE. That is, an on-off keying (OOK) modulation scheme can be used in SR transmission. Therefore, any complex value can be used as a value of the modulation symbol d(0) for the PUCCH format 1. For example, d(0)=1 may be used. The modulation symbol d(0) for the PUCCH format 1a is a modulation symbol generated when an encoded bit (1 bit) is modulated by using binary phase shift keying (BPSK). The complex-valued symbol d(0) for the PUCCH format 1b is a modulation symbol generated when encoded bits (2 bits) are modulated by using quadrature phase shift keying (QPSK).

Table 6 below shows an example of a modulation symbol to which an ACK/NACK bit is mapped according to a modulation scheme.

TABLE 6

| Modulation scheme | Bit(s) | d(0) |
|---|---|---|
| BPSK | 0 | 1 |
|  | 1 | −1 |
| QPSK | 00 | 1 |
|  | 01 | −j |
|  | 10 | j |
|  | 11 | −1 |

Figure 11:
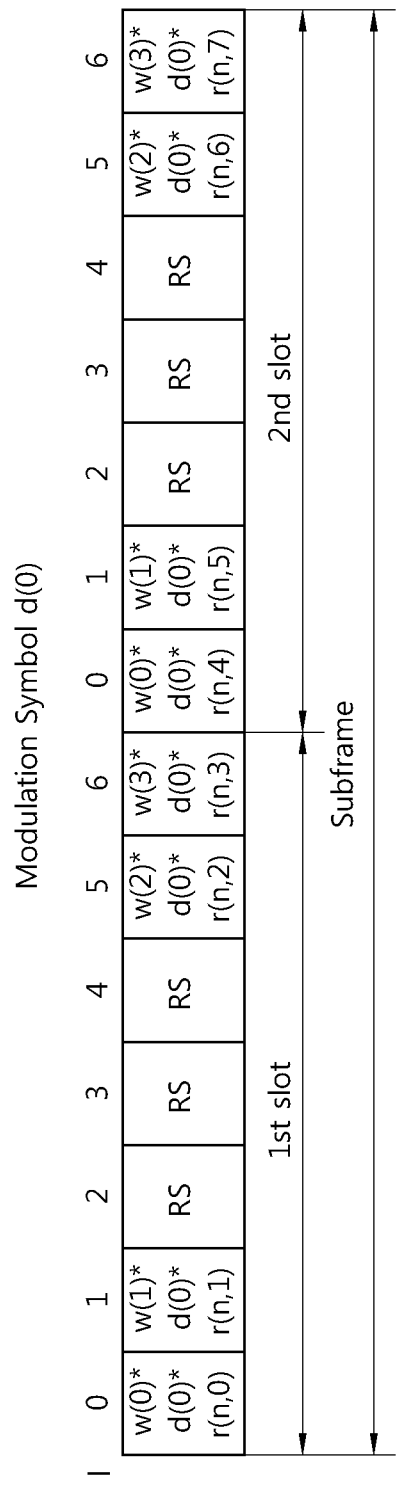
FIG. 11 shows an example of PUCCH format 1/1a/1b transmission in case of a normal CP.

FIG. 11 shows an example of PUCCH format 1/1 a/1b transmission in case of a normal CP. Although it is expressed herein that resource blocks belonging to a resource block pair occupy the same frequency band in a 1st slot and a 2nd slot, the resource blocks can be hopped in a slot level as described with reference to FIG. 7.

Referring to FIG. 11, the 1st slot and the 2nd slot each include 7 OFDM symbols. Among the 7 OFDM symbols included in each slot, 3 OFDM symbols correspond to an RS part to which an RS sequence is mapped, and the remaining 4 OFDM symbols correspond to an information part to which an information sequence is mapped. The RS part corresponds to 3 contiguous OFDM symbols located in the middle of each slot. The position and number of OFDM symbols used as the RS part in each slot may vary, and thus the position and number of OFDM symbols used as the information part may also vary.

In the information part, an information sequence is generated based on a modulation symbol d(0), a cyclically shifted sequence r(n,Ics), and an orthogonal sequence w(k, Ios). The cyclically shifted sequence r(n,Ics) may also be referred to as a 1st sequence, and the orthogonal sequence w(k, Ios) may also be referred to as a 2nd sequence. Therefore, the information sequence is a two-dimensional spread sequence. By spreading information to a time-space domain, UE multiplexing capacity can be increased. The UE multiplexing capacity is the number of UEs that can be multiplexed to the same resource block.

The cyclically shifted sequence r(n,Ics) is generated from a base sequence for each OFDM symbol used as the information part within the subframe. The base sequence is identical within one slot. The 1st slot and the 2nd slot may have identical or different base sequences within the subframe. The cyclically shifted index Ics is determined from a resource index. The cyclically shifted index Ics can be CS-hopped in a symbol level. Hereinafter, hopping of a CS index in the symbol level is called CS hopping. The CS hopping can be performed according to a slot number n(s) within a radio frame and a symbol index I within a slot. Therefore, the CS index Ics can be expressed by Ics(n(s),I). CS hopping can be performed in a cell-specific manner to randomize inter-cell interference. In FIG. 11, the value Ics for each OFDM symbol in the information part is for exemplary purposes only.

A 1st sequence s(n) spread in a frequency domain is generated for each OFDM symbol of the information part on the basis of the modulation symbol d(0) and the cyclically shifted sequence r(n,Ics). The 1st sequence s(n) can be generated by multiplying the modulation symbol d(0) by the cyclically shifted sequence r(n,Ics) according to Equation 6 below.

$$s(n)=d(0)r(n,I_{cs})$$ [Equation 6]

An information sequence spread to a time-frequency domain is generated on the basis of the 1st sequence s(n) generated for each OFDM symbol of the information part and the orthogonal sequence w(k, Ios) having a length of K=4. The 1st sequence may be spread in a block type by using the orthogonal sequence w(k, Ios) to generate the information sequence. Elements constituting the orthogonal sequence correspond to OFDM symbols of the information part sequentially in a one-to-one manner. Each of the elements constituting the orthogonal sequence is multiplied by the 1st sequence s(0) mapped to its corresponding OFDM symbol to generate the information sequence.

The information sequence is mapped to a resource block pair allocated to a PUCCH within the subframe. The resource block pair is determined from the resource index. After the information sequence is mapped to the resource block pair, IFFT is performed on each OFDM symbol of the subframe to output a time-domain signal. Although the orthogonal sequence is multiplied before IFFT is performed in this case, the same result can also be obtained when the 1st sequence s(n) is mapped to the resource block pair and thereafter the orthogonal sequence is multiplied.

When a sounding reference signal (SRS) and the PUCCH formats 1/1a/1b are concurrently transmitted in one subframe, one OFDM symbol on the PUCCH is punctured. For example, a last OFDM symbol of the subframe may be punctured. In this case, in the 1st slot of the subframe, the control information consists of 4 OFDM symbols. In the 2nd slot of the subframe, the control information consists of 3 OFDM symbols. Therefore, the orthogonal sequence having the spreading factor K=4 is used for the 1st slot, and the orthogonal sequence having the spreading factor K=3 is used for the 2nd slot.

An orthogonal sequence Ios is determined from the resource index. The orthogonal sequence index Ios may be hopped in a slot level. Hereinafter, hopping of the orthogonal sequence index in the slot level is referred to as orthogonal sequence (OS) remapping. The OS remapping can be performed according to the slot number $n_s$ within the radio frame. Therefore, the orthogonal sequence index Ios can be expressed by Ios($n_s$). The OS remapping may be performed to randomize inter-cell interference.

In the RS part, the RS sequence is generated on the basis of the cyclically shifted sequence r(n,I'cs) and the orthogonal sequence w(k, I'os) having a length of K=3. I'cs denotes a CS index for the RS, and I'os denotes an orthogonal sequence index for the RS. I'cs and I'os are determined from respective resource indices. A cyclically shifted sequence is a frequency-domain sequence, and an orthogonal sequence is a time-domain sequence. Therefore, the RS sequence is a sequence which is spread to a time-frequency domain similarly to the information sequence.

In the RS part, the base sequence for generating the cyclically shifted sequence may be identical to the base sequence of the information part. The CS index Ics of the information part and the CS index I'cs of the RS part are both determined from the resource index. However, a method of determining the CS index from the resource index may be identical or different between the information part and the RS part.

Figure 12:
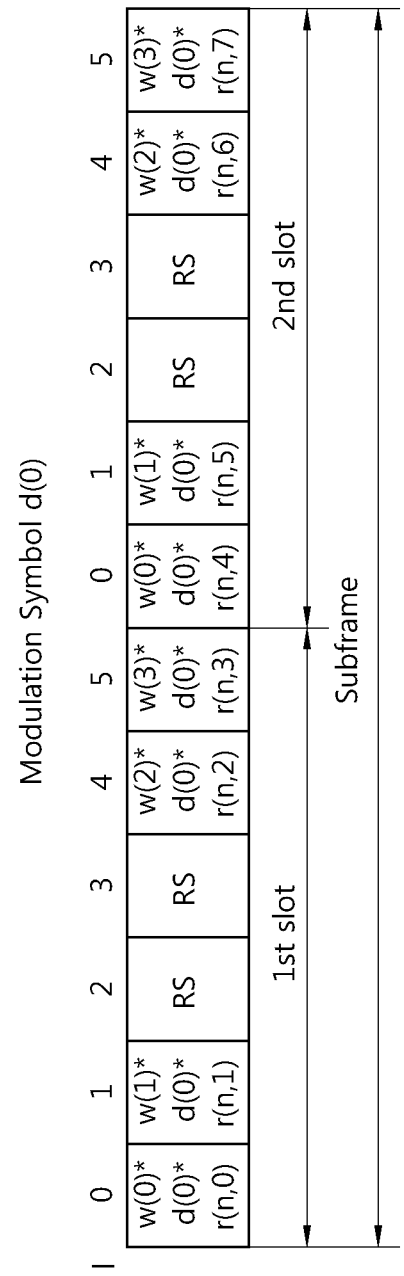
FIG. 12 shows an example of PUCCH format 1/1a/1b transmission in case of an extended CP.

FIG. 12 shows an example of PUCCH format 1/1a/1b transmission in case of an extended CP. Although it is expressed herein that resource blocks belonging to a resource block pair occupy the same frequency band in a 1st slot and a 2nd slot, the resource blocks can be hopped in a slot level as described with reference to FIG. 7.

Referring to FIG. 12, the 1st slot and the 2nd slot each include 6 OFDM symbols. Among the 6 OFDM symbols included in each slot, 2 OFDM symbols correspond to an RS part, and the remaining 4 OFDM symbols correspond to an information part. Other than that, the example of FIG. 11 in which the normal CP is used is applied directly. However, in the RS part, an RS sequence is generated on the basis of the cyclically shifted sequence and an orthogonal sequence having a length of K=2.

As described above, in both cases of the normal CP and the extended CP, a resource used for PUCCH format 1/1a/1b transmission has to be identified by a resource index. A resource block for transmitting information, a CS index Ics and an orthogonal sequence index Ios for generation of an information sequence, and a CS index I'cs and an orthogonal sequence index I'os for generation of the RS sequence are determined from the resource index.

For example, when a CS interval is 2 in the extended CP, the UE multiplexing capacity is as follows. Since the number of CS indices Ics and the number of orthogonal sequence indices Ios for the control information are respectively 6 and 3, 18 UEs can be multiplexed per one RB. However, the number of CS indices I'cs and the number of orthogonal sequence indices I'os for generation of the RS sequence are respectively 6 and 2, 12 UEs can be multiplexed per one resource block. Therefore, the UE multiplexing capacity is limited by the RS part rather than the information part.

Figure 13:
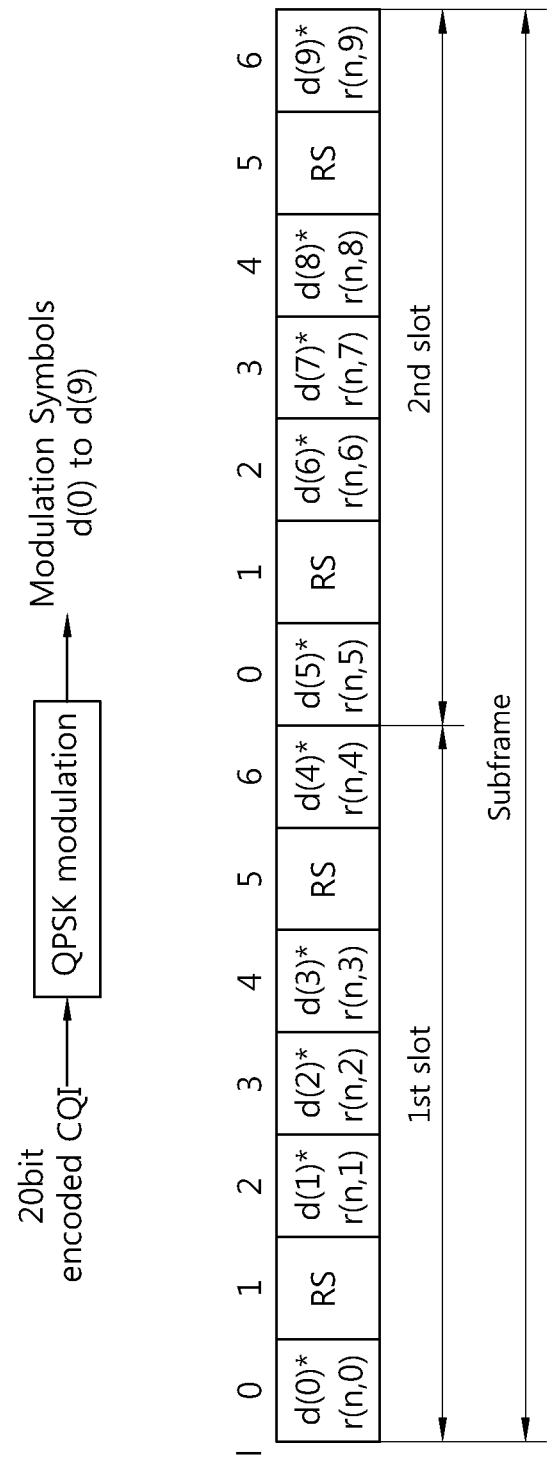
FIG. 13 shows an example of PUCCH format 2 transmission when a normal CP is used.

FIG. 13 shows an example of PUCCH format 2 transmission when a normal CP is used. Although it is shown herein that resource blocks belonging to a resource block pair occupy the same frequency band in a $1^{st}$ slot and a $2^{nd}$ slot, the resource blocks may be hopped in a slot level as described in FIG. 7.

Referring to FIG. 13, among the 7 OFDM symbols included in each slot, 2 OFDM symbols correspond to an RS part to which an RS sequence is mapped, and the remaining 5 OFDM symbols correspond to an information part to which an information sequence is mapped. The position and number of OFDM symbols used as the RS part in each slot may vary, and thus the position and number of OFDM symbols used as the information part may also vary.

A UE generates an encoded CQI bit by performing channel coding on a CQI information bit. In this case, a block code may be used. In 3GPP LTE, a block code (20, A) is used, where A is a size of the CQI information bit. That is, in the 3GPP LTE, encoded bits (20 bits) are generated always irrespective of the size of the CQI information bit.

Table 7 below shows an example of 13 basis sequences for the block code (20, A).

mapped to one modulation symbol d(10) by using BPSK modulation. In the PUCCH format 2b, 2-bit HARQ ACK/NACK information is mapped to one modulation symbol d(10) by using QPSK modulation. That is, in the PUCCH format 2a, the CQI and the 1-bit HARQ ACK/NACK information are concurrently transmitted, and in the PUCCH format 2b, the CQI and the 2-bit HARQ ACK/NACK information are concurrently transmitted. Herein, d(10) is used for generation of an RS. d(10) corresponds to one OFDM symbol between two OFDM symbols on which the RS is carried in each slot. In other words, according to d(10), phase modulation is performed on the RS carried on one OFDM symbol in each slot. The PUCCH formats 2a/2b can be supported only for the normal CP. As such, in each of the PUCCH formats 2a and 2b, one modulation symbol is used for generation of the RS.

In the information part, an information sequence is generated based on modulation symbols d(0), . . . , d(9) and a cyclically shifted sequence r(n,Ics). Each modulation symbol can be multiplied to the cyclic shifted sequence r(n,Ics). The information sequence is a one-dimensional spread sequence. Unlike the PUCCH formats 1/1a/1b, an orthogonal sequence is not used in the PUCCH formats 2/2a/2b.

The cyclically shifted sequence r(n,Ics) is generated from a base sequence for each OFDM symbol used as the information part within the subframe. The base sequence is identical within one slot. The $1^{st}$ slot and the $2^{nd}$ slot may have identical or different base sequences within the subframe. The cycli-

TABLE 7

| i | M(i, 0) | M(i, 1) | M(i, 2) | M(i, 3) | M(i, 4) | M(i, 5) | M(i, 6) | M(i, 7) | M(i, 8) | M(i, 9) | M(i, 10) | M(i, 11) | M(i, 12) |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

In Table 7, $M_{i,n}$ denotes a basis sequence (where $0 \leq n \leq 12$, n is an integer). The encoded bit is generated by linear combination of the 13 basis sequences. Equation 7 below shows an example of the encoded bit $b_i$ ($0 \leq i \leq 19$, where i is an integer).

$$b(i) = \sum_{n=0}^{A-1} \{a(n) \cdot M(i, n)\} \bmod 2 \quad \text{[Equation 7]}$$

In Equation 7, $a_0, a_1, \ldots, a_{A-1}$ denotes an information bit, and A denotes the size of the information bit (where A is a natural number).

The encoded bits (20 bits) are mapped to 10 modulation symbols d(0), . . . , d(9) by using QPSK modulation. In the PUCCH format 2a, 1-bit HARQ ACK/NACK information is cally shifted index Ics is determined from a resource index. The cyclically shifted index Ics can be CS-hopped in a symbol level. The CS hopping can be performed according to a slot number n(s) within a radio frame and a symbol index I within a slot. Therefore, the CS index Ics can be expressed by Ics(n(s),I). In FIG. 13, a value Ics for each OFDM symbol in the information part is for exemplary purposes only.

In the RS part, the cyclically shifted sequence r(n,I'cs) can be used as the RS sequence. I'cs is a CS index for the RS. I'cs is determined from the resource index.

In the RS part, the base sequence for generating the cyclically shifted sequence may be identical to the base sequence of the information part. The CS index Ics of the information part and the CS index I'cs of the RS part are both determined from the resource index. However, a method of determining the CS index from the resource index may be identical or different between the information part and the RS part.

In the PUCCH format 2a/2b, d(10) corresponds to one OFDM symbol of the RS part. That is, an RS sequence in which d(10) and the cyclically shifted sequence are multiplied is mapped to one OFDM symbol of the RS part within each slot.

Figure 14:
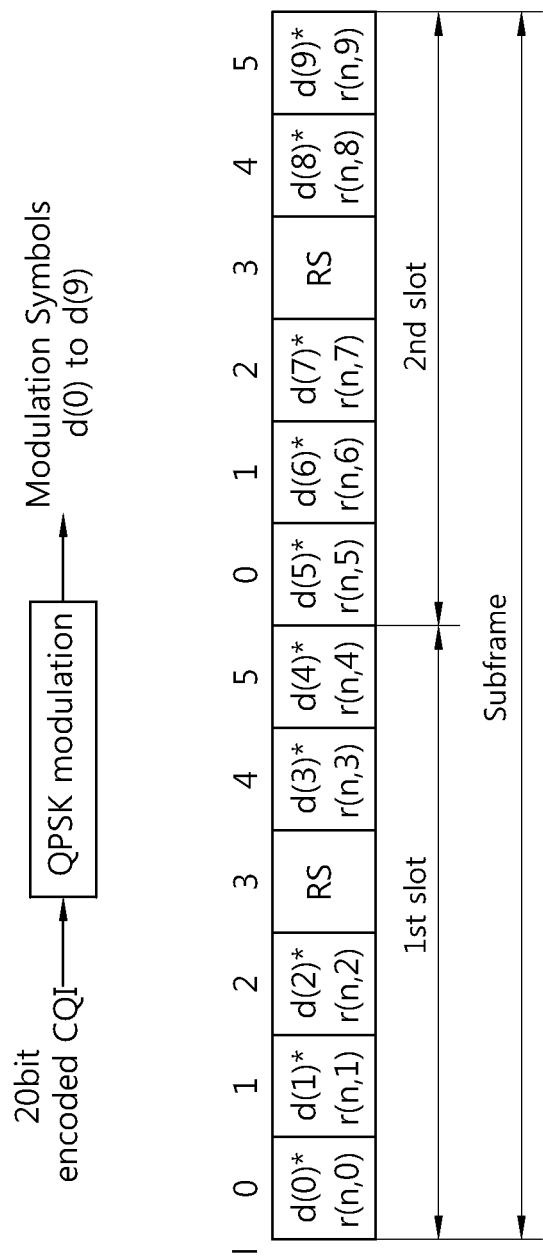
FIG. 14 shows an example of PUCCH format 2 transmission when an extended CP is used.

FIG. 14 shows an example of PUCCH format 2 transmission when an extended CP is used. Although it is shown herein that resource blocks belonging to a resource block pair occupy the same frequency band in a $1^{st}$ slot and a $2^{nd}$ slot, the resource blocks may be hopped in a slot level as described in FIG. 7.

Referring to FIG. 14, each of the $1^{st}$ slot and the $2^{nd}$ slot includes 6 OFDM symbols. Among the 6 OFDM symbols included in each slot, one OFDM symbol corresponds to an RS part, and the remaining 5 OFDM symbols correspond to an information part. Other than that, the normal CP case of FIG. 13 is applied directly.

As described above, in both cases of the normal CP and the extended CP, a resource used for PUCCH format 2/2a/2b transmission has to be identified by a resource index. A resource block for transmitting information, a CS index Ics for generation of an information sequence, and a CS index I'cs for generation of an RS sequence are determined from the resource index. If a CS interval is 1, the number of CS indices Ics is 12 and the number of CS indices I'cs is 12. Thus, 12 UEs can be multiplexed per one resource block. If the CS interval is 2, the number of CS indices Ics is 6 and the number of CS indices I'cs is 6. Thus, 6 UEs can be multiplexed per one resource block.

As such, information can be transmitted by using CDM and/or FDM as a multiplexing scheme. In the information transmission method described up to now, one Tx antenna and one resource index are used. However, in order to increase an amount of information transmitted at one time, multiple resources can be allocated to a transmitter. In addition, the transmitter to which the multiple resources are allocated can transmit information through multiple antennas. Therefore, there is a need to provide a method of transmitting information by using multiple antennas and multiple resources by the transmitter.

Figure 15:
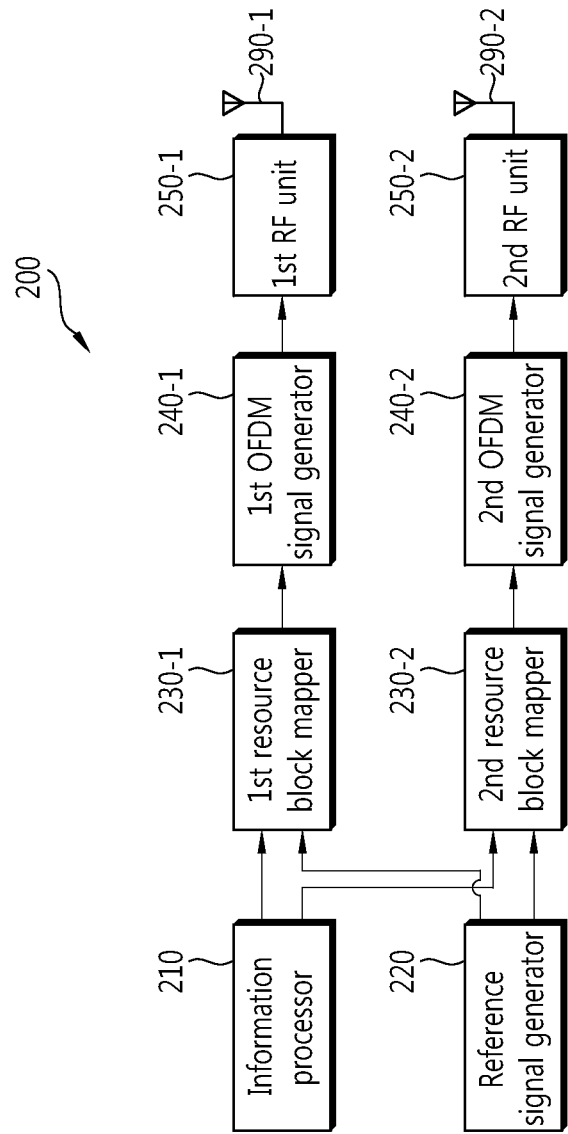
FIG. 15 is a block diagram showing an exemplary structure of a transmitter including two antennas.

FIG. 15 is a block diagram showing an exemplary structure of a transmitter including two antennas. Herein, the transmitter may be a part of a UE or a part of a BS.

Referring to FIG. 15, a transmitter 200 includes an information processor 210, a reference signal generator 220, $1^{st}$ and $2^{nd}$ resource block mappers 230-1 and 230-2, $1^{st}$ and $2^{nd}$ OFDM signal generators 240-1 and 240-2, $1^{st}$ and $2^{nd}$ RF units 250-1 and 250-2, and two antennas 290-1 and 290-2.

The $1^{st}$ and $2^{nd}$ resource block mappers 230-1 and 230-2 are respectively coupled to the $1^{st}$ and $2^{nd}$ OFDM signal generators 240-1 and 240-2. The $1^{st}$ and $2^{nd}$ OFDM signal generators 240-1 and 240-2 are respectively coupled to the $1^{st}$ and $2^{nd}$ RF units 250-1 and 250-2. The $1^{st}$ and $2^{nd}$ RF units 250-1 and 250-2 are respectively coupled to the two antennas 290-1 and 290-2. That is, an $n^{th}$ resource block mapper 230-$n$ is coupled to an $n^{th}$ OFDM symbol generator 240-$n$, the $n^{th}$ OFDM signal generator 240-$n$ is coupled to an $n^{th}$ RF unit 250-$n$, and the $n^{th}$ RF unit is coupled to an $n^{th}$ antenna 290-$n$. In case of multiple-antenna transmission, there may be one resource grid defined for each antenna.

Two resource indices are allocated to the transmitter 200. The information processor 210 generates information sequences based on the two resource indices. Other than that, the description on the information transmission method of FIG. 8 to FIG. 14 can also be applied to a method and apparatus for information transmission through a plurality of Tx antennas.

Hereinafter, a method of generating information sequences based on two resource indices in the information processor 210 will be described.

Figure 16:
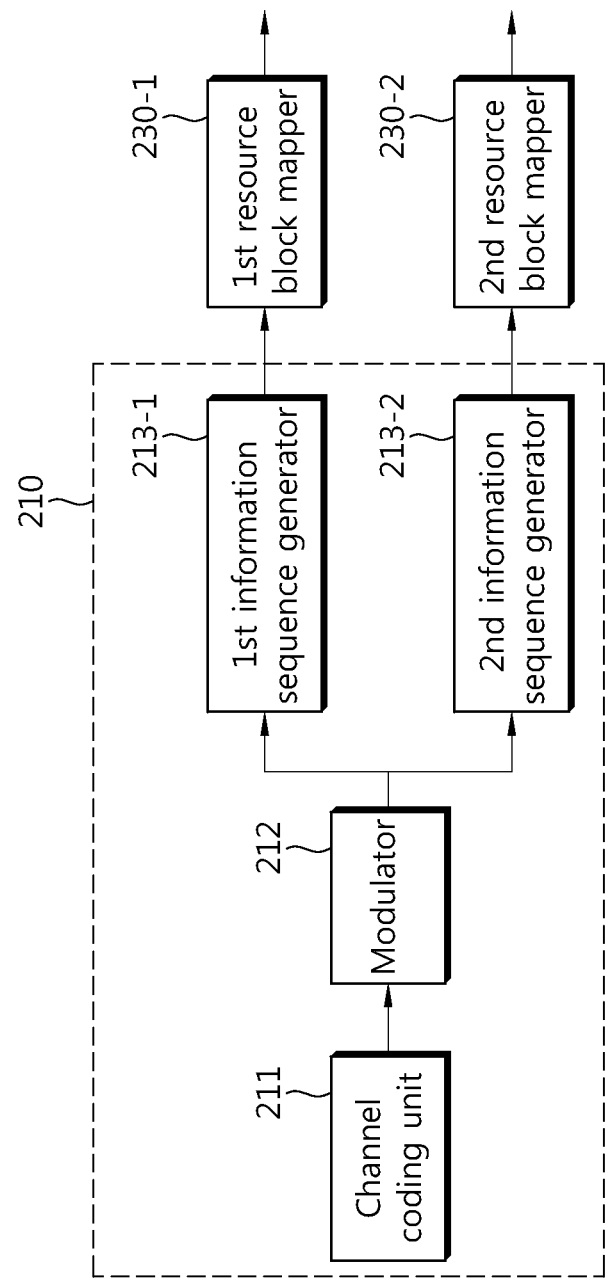
FIG. 16 is a block diagram showing an exemplary structure of a part of a transmitter including two antennas.

FIG. 16 is a block diagram showing an exemplary structure of a part of a transmitter including two antennas.

Referring to FIG. 16, the information processor 210 includes a channel coding unit 211, a modulator 212, and $1^{st}$ and $2^{nd}$ information sequence generators 213-1 and 213-2. The $1^{st}$ information sequence generator 213-1 is coupled to a $1^{st}$ resource block mapper 230-1, and the $2^{nd}$ information sequence generator 213-2 is coupled to a $2^{nd}$ resource block mapper 230-2.

The information processor 210 can generate information sequences by using orthogonal space resource transmit diversity (OSRTD) or orthogonal space resource spatial multiplexing (OSRSM).

1. OSRTD

It is assumed that s(1) is an information symbol corresponding to information to be transmitted by the transmitter 200. Herein, the information symbol may be any signal, a complex-valued signal, one or more modulation symbols, or a spread sequence.

The modulator 212 outputs s(1). Then, s(1) is input to each of the $1^{st}$ information sequence generator 213-1 and the $2^{nd}$ information sequence generator 213-2.

The $1^{st}$ information sequence generator 213-1 generates a $1^{st}$ information sequence based on s(1) and a $1^{st}$ resource index. The $2^{nd}$ information sequence generator 213-2 generates a $2^{nd}$ information sequence based on s(1) and a $2^{nd}$ resource index. The $1^{st}$ information sequence is transmitted through the $1^{st}$ antenna 290-1, and the $2^{nd}$ information sequence is transmitted through the $2^{nd}$ antenna 290-2. When the $1^{st}$ resource index and the $2^{nd}$ resource index are allocated differently, orthogonality can be maintained between antennas.

In order to perform channel estimation for each antenna, an RS has to be generated for each antenna. For this, each resource index may be mapped to each antenna in a one-to-one manner. Therefore, an RS for the $1^{st}$ antenna may be generated based on the $1^{st}$ resource index, and an RS for the $2^{nd}$ antenna may be generated based on the $2^{nd}$ resource index.

As such, the OSRTD is a method in which a resource index is allocated for each antenna and the same information is repetitively transmitted in an orthogonal manner for each antenna. By repetitively transmitting the same information through a plurality of antennas, a diversity gain can be obtained, and reliability of wireless communication can be increased.

If it is assumed that 18 UEs can be multiplexed per one resource block in case of single-antenna transmission, 9 UEs can be multiplexed per one resource block when using OSRTD for two antennas. In case of the PUCCH format 1/1a/1b, the same information is transmitted in a $1^{st}$ slot and a $2^{nd}$ slot. A resource block allocated to the PUCCH is hopped in a slot level. That is, by transmitting information through different subcarriers over time, a frequency diversity gain can be obtained. However, if a sufficient diversity gain can be obtained by using the OSRTD, the same control information as that of the $1^{st}$ slot is not necessarily transmitted in the $1^{st}$ slot. Therefore, different information can be transmitted in the $1^{st}$ slot and the $2^{nd}$ slot. In this case, UE multiplexing capacity of the OSRTD for the two antennas may be maintained to be the same as UE multiplexing capacity of single-antenna transmission. For example, in case of the single-antenna transmission, if 18 UEs are multiplexed per one resource block, 18 UEs can also be multiplexed per one resource block even in the OSRTD for the two antennas.

The $2^{nd}$ information sequence generator 213-2 may generate the $2^{nd}$ information sequence by modifying the information symbol s(1). For example, the $2^{nd}$ information sequence can be generated based on s(1)* and the $2^{nd}$ resource index. Herein, (•)* denotes a complex conjugate. Alternately, a modified information symbol s(2) processed by the $2^{nd}$ information sequence generator can be expressed by Equation 8 below.

$$s(2)=s(1)\cdot\exp(j\theta) \text{ or } a\cdot s(1) \quad \text{[Equation 8]}$$

In Equation 8, 'a' denotes a complex-valued scaling factor of the $2^{nd}$ information sequence generator.

A Tx signal matrix can be expressed by Equation 9 below.

$$\begin{bmatrix} y(1) \\ y(2) \end{bmatrix} = \begin{bmatrix} s(1) & 0 \\ 0 & s(1) \end{bmatrix} \begin{bmatrix} h(1) \\ h(2) \end{bmatrix} + \begin{bmatrix} n(1) \\ n(2) \end{bmatrix} \quad \text{[Equation 10]}$$

In Equation 9, a row and/or column of the Tx signal matrix may correspond to a Tx antenna, a resource index, etc. For example, rows of the Tx signal matrix may correspond to respective resource indices, and columns thereof may correspond to respective Tx antennas.

y(1) denotes a $1^{st}$ Rx signal for the $1^{st}$ information sequence generated based on the $1^{st}$ resource index. y(2) denotes a $2^{nd}$ Rx signal for the $2^{nd}$ information sequence generated based on the $2^{nd}$ resource index. An actual Rx signal y is a combination of the $1^{st}$ Rx signal y1 and the $2^{nd}$ Rx signal y2, i.e., y=y(1)+y(2). However, it is assumed that the Rx signal y can be split into the $1^{st}$ Rx signal y1 and the $2^{nd}$ Rx signal y2 by using a de-spreading operation. For convenience of explanation, it is assumed that a receiver has one Rx antenna.

An Rx signal matrix can be expressed by Equation 10 below.

$$\begin{bmatrix} s(1) & 0 \\ 0 & s(1) \end{bmatrix} \quad \text{[Equation 9]}$$

In Equation 10, h(1) denotes a channel for the $1^{st}$ antenna 290-1, h(2) denotes a channel for the $2^{nd}$ antenna 290-1, n(1) denotes noise of the $1^{st}$ Rx signal, and n(2) denotes noise of the $2^{nd}$ Rx signal. Herein, the noise may be additive white Gaussian noise (AWGN).

In general, if Tx power is limited, a normalization factor corresponding to the number of Tx antennas can be used. Equation 11 below shows an example of the normalization factor.

$$\frac{1}{\sqrt{Ntx \times Nc}} \quad \text{[Equation 11]}$$

In Equation 11, Ntx denotes the number of Tx antennas, and Nc denotes the number of resources per antenna. However, for convenience of explanation, the normalization factor is omitted in the following description.

When de-spreading is performed on each resource index from the Rx signal, a diversity gain can be obtained as expressed by Equation 12 below.

$$|h(1)|^2+|h(2)|^2 \quad \text{[Equation 12]}$$

The diversity gain is similar to maximal ratio coding (MRC) which is optimal combining. The MRC scheme is one of signal combining schemes for estimating a Tx signal from an Rx signal received through a plurality of Rx antennas.

Although it is described herein that the number of Tx antennas is 2 for convenience of explanation, the number of Tx antennas is not limited thereto.

When the transmitter includes M antennas (where M is a natural number), M resource indices can be allocated. The M antennas can be one-to-one mapped to the M resource indices, respectively. If the number of Tx antennas is 3 or more, OSRTD can be used in combination with other Tx diversity schemes such as cyclic delay diversity (CDD) or precoding vector switching (PVS). For example, when using 4 Tx antennas, the 4Tx antennas can be divided by two, and thus can be grouped into two antenna groups. The OSRTD is applied to each of the two antenna groups, and the CDD or the PVS can be applied between the groups.

2. OSRSM

It is assumed that s(1) and s(2) are symbols corresponding to information to be transmitted by the transmitter 200. In this case, s(1) and s(2) may be symbols obtained after performing joint coding on information bits.

The $1^{st}$ information sequence generator 213-1 generates the $1^{st}$ information sequence based on the $1^{st}$ information symbols s(1) and the $1^{st}$ resource index. The $2^{nd}$ information sequence generator 213-2 generates the $2^{nd}$ information sequence based on the $2^{nd}$ information symbol s(2) and the $2^{nd}$ resource index. The $1^{st}$ information sequence is transmitted through the $1^{st}$ antenna 290-1, and the $2^{nd}$ information sequence is transmitted through the $2^{nd}$ antenna 290-2. When the $1^{st}$ resource index and the $2^{nd}$ resource index are allocated differently, orthogonality can be maintained between antennas.

In order to perform channel estimation for each antenna, an RS has to be generated for each antenna. For this, each resource index may be mapped to each antenna in a one-to-one manner. Therefore, an RS for the $1^{st}$ antenna may be generated based on the $1^{st}$ resource index, and an RS for the $2^{nd}$ antenna may be generated based on the $2^{nd}$ resource index.

Although it is described herein that the number of Tx antennas is 2 for convenience of explanation, the number of Tx antennas is not limited thereto.

When the transmitter includes M antennas (where M is a natural number), the transmitter can transmit M symbols. M resource indices can be allocated to the transmitter. The M antennas can be one-to-one mapped to the M resource indices, respectively. Different symbols can be transmitted through the respective M antennas. As such, an information transmission method having a spatial multiplexing rate of M is called OSRSM.

The encoded bit which is bit-level information output from the channel coding unit 211 can be permutated before being modulated by the modulator 212.

It is assumed that $1^{st}$ encoded bits (2 bits) a(0) and a(1) and $2^{nd}$ encoded bits (2 bits) b(0) and b(1) are input to the modulator 212. For example, the $1^{st}$ encoded bit may be bit-level information of $1^{st}$ ACK/NACK for $1^{st}$ data transmitted through a $1^{st}$ DL carrier, and the $2^{nd}$ encoded bit may be bit-level information of $2^{nd}$ ACK/NACK for $2^{nd}$ data transmitted through a $2^{nd}$ DL carrier.

The modulator 212 may generate a $1^{st}$ modulation symbol d(0) by performing QPSK modulation on the $1^{st}$ encoded bit, and may generate a $2^{nd}$ modulation symbol e(0) by performing QPSK modulation on the $2^{nd}$ encoded bit.

Alternatively, the modulator 212 may replace the $1^{st}$ encoded bit and the $2^{nd}$ encoded bit and then modulate the bits after replacement. For example, the modulator 212 may replace the bits by swapping the $1^{st}$ bits a(0) and b(0) of the $1^{st}$ and $2^{nd}$ encoded bits. The modulator may generate the $1^{st}$ modulation symbol d(0) by modulating the bits b(0) and a(1), and may generate the $2^{nd}$ modulation symbol e(0) by modulating the bits a(0) and b(1).

The modulation symbols output from the modulator 212 are input to a splitter (not shown). The splitter splits the modulation symbol into the $1^{st}$ information symbol s(1) and the $2^{nd}$ information symbol s(2) by using the $1^{st}$ modulation symbol d(0) and the $2^{nd}$ modulation symbol e(0). For one example, the $1^{st}$ modulation symbol may correspond to the $1^{st}$ information symbol, and the $2^{nd}$ modulation symbol may correspond to the $2^{nd}$ information symbol. For another example, the $1^{st}$ modulation symbol and the $2^{nd}$ modulation symbol may be replaced and/or mixed and then may be split into the $1^{st}$ information symbol and the $2^{nd}$ information symbol.

Equation 13 below shows examples of the $1^{st}$ modulation symbol d(0) and the $2^{nd}$ modulation symbol e(0) which are replaced and/or mixed and then are split into the $1^{st}$ information symbol s(1) and the $2^{nd}$ information symbol s(2).

$$s(1)=d(0)+e(0), s(2)=d(0)-e(0)$$

$$s(1)=d(0)-e(0)^*, s(2)=e(0)+d(0)^* \quad \text{[Equation 13]}$$

Alternatively, as expressed by Equation 14 below, the $1^{st}$ modulation symbol d(0) and the $2^{nd}$ modulation symbol e(0) may be rotated by any phase, be replaced and/or mixed, and then be split into the $1^{st}$ information symbol s(1) and the $2^{nd}$ information symbol s(2).

$$s(1)=d(0)+e(0)e^{ja}, s(2)=d(0)-e(0)e^{jb}$$

$$s(1)=d(0)-e(0)^*e^{ja}, s(2)=e(0)+d(0)^*e^{jb} \quad \text{[Equation 14]}$$

In Equation 14, 'a' and 'b' may be identical or different from each other.

In the OSRTD or OSRSM based information transmission method, a plurality of antennas and a plurality of resource indices may be mapped in a one-to-one manner. However, a problem occurs in the information transmission method when a plurality of resource indices are mapped to one antenna.

Figure 17:
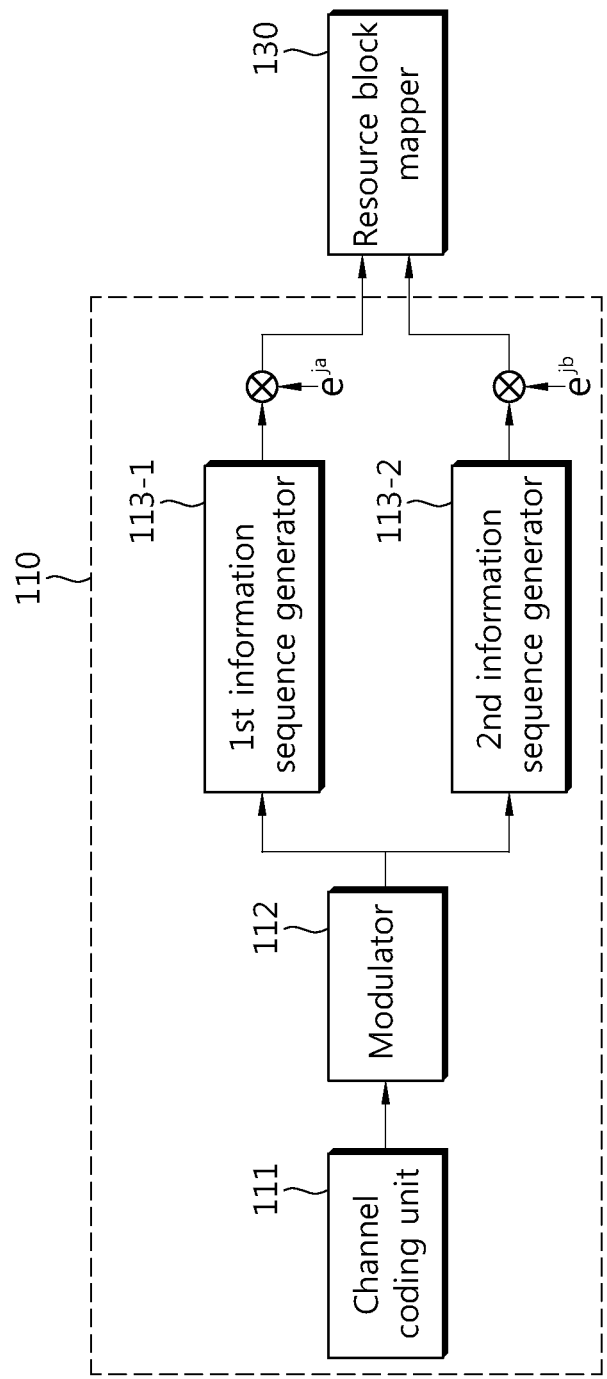
FIG. 17 is a block diagram showing an exemplary structure of a part of a transmitter including a single antenna.

FIG. 17 is a block diagram showing an exemplary structure of a part of a transmitter including a single antenna. Herein, the transmitter may be the transmitter 100 of FIG. 8.

Referring to FIG. 17, an information processor 110 includes a channel coding unit 111, a modulator 112, and $1^{st}$ and $2^{nd}$ information sequence generators 113-1 and 113-2. The $1^{st}$ and $2^{nd}$ information sequence generators 113-1 and 113-2 are coupled to a resource block mapper 130.

The channel coding unit 111 may perform joint coding on all information bits.

The modulator 112 outputs a $1^{st}$ information symbol s(1) and a $2^{nd}$ information symbol s(2). Each of the symbols s(1) and s(2) corresponds to information to be transmitted by the transmitter 100.

The $1^{st}$ information symbol s(1) is input to the $1^{st}$ information sequence generator 113-1, and the $2^{nd}$ information symbol s(2) is input to the $2^{nd}$ information sequence generator 113-2.

The $1^{st}$ information sequence generator 113-1 generates a $1^{st}$ information sequence based on the $1^{st}$ information symbol s(1) and a $1^{st}$ resource index. The $2^{nd}$ information sequence generator 113-2 generates a $2^{nd}$ information sequence based on the $2^{nd}$ information symbol s(2) and a $2^{nd}$ resource index.

Each of the $1^{st}$ information sequence and the $2^{nd}$ information sequence is input to the resource block mapper 130. In this case, the $1^{st}$ information sequence and/or the $2^{nd}$ information sequence may be subjected to phase shift. This is to prevent the $1^{st}$ information sequence and the $2^{nd}$ information sequence from being offset when the two sequences are combined. The $1^{st}$ information sequence and the $2^{nd}$ information sequence are combined and are transmitted through one antenna 190 (see FIG. 8).

1. Multi-Sequence Modulation (MSM)

Figure 18:
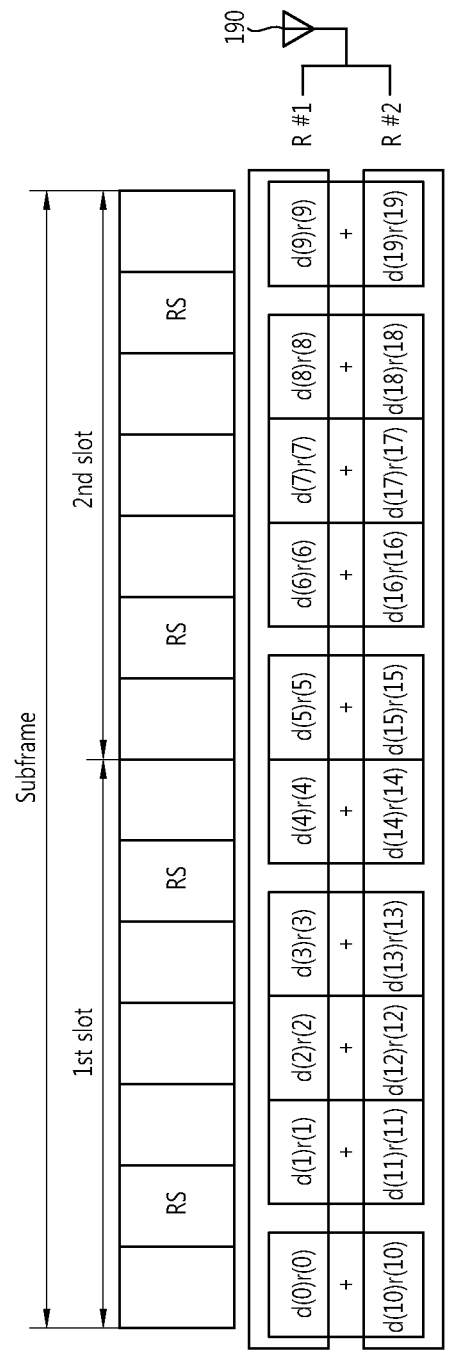
FIG. 18 shows an example of information transmission using two resources through one antenna.

FIG. 18 shows an example of information transmission using two resources through one antenna.

Referring to FIG. 18, an information sequence is generated in a normal CP in the same format as the PUCCH format 2. 10 modulation symbols may be transmitted by performing QPSK modulation on encoded bits (20 bits) on the basis of one resource index. When using two resource indices, 20 modulation symbols d(0), d(1), . . . , d(19) can be transmitted by performing QPSK modulation on encoded bits (40 bits). The symbols d(0), d(1), . . . , d(9) correspond to a $1^{st}$ information symbol, and the symbols d(10), d(11), . . . , d(19) correspond to a $2^{nd}$ information symbol.

A sequence r(n,Ics) having a length of N (where N is a natural number, n is a component index of a sequence, $0 \leq n \leq N-1$, and Ics is a sequence index) is determined for each OFDM symbol of an information part from each of the $1^{st}$ resource index and the $2^{nd}$ resource index. The sequence r(n,Ics) is a resource used for transmitting information identified from a resource index. The sequence index Ics may be determined from the resource index. Once the sequence index Ics is determined, the sequence r(n,Ics) can be generated. For example, the sequence r(n,Ics) may be a cyclically shifted sequence. The sequence index Ics may be hopped in a symbol level. For convenience of explanation, the sequence r(n,Ics) can be expressed by r(Ics) by omitting the element index n.

$1^{st}$ sequences determined for respective OFDM symbols of the information part from the $1^{st}$ resource index are r(0), r(1), . . . , r(9). Herein, the sequence index Ics of each of the $1^{st}$ sequences is for exemplary purposes only. $1^{st}$ information sequences are d(0)r(0), d(1)r(1), . . . , d(9)r(9).

$2^{nd}$ sequences determined for respective OFDM symbols of the information part from the $2^{nd}$ resource index are r(10), r(11), . . . , r(19). Herein, the sequence index Ics of each of the $2^{nd}$ sequences is for exemplary purposes only. $2^{nd}$ information sequences are d(10)r(10), d(11)r(11), . . . , d(19)r(19).

The $1^{st}$ sequences are a $1^{st}$ resource R#1 identified from the $1^{st}$ resource index. The $2^{nd}$ sequences are a $2^{nd}$ resource R#2 identified from the $2^{nd}$ resource index.

The resource index may further identify a resource block in addition to a sequence. In this case, the $1^{st}$ information sequence is mapped to a $1^{st}$ resource block determined from the $1^{st}$ resource index, and the $2^{nd}$ information sequence is mapped to a $2^{nd}$ resource block determined from the $2^{nd}$ resource index. The $1^{st}$ resource is the $1^{st}$ sequences and the $1^{st}$ resource block, and the $2^{nd}$ resource is the $2^{nd}$ sequences and the $2^{nd}$ resource block. The $1^{st}$ resource and the $2^{nd}$ resource are orthogonal to each other.

The 20 modulation symbols are carried on the $1^{st}$ and $2^{nd}$ resources orthogonal to each other and then finally transmitted by being combined through one antenna.

In the MSM, the modulator 112 (see FIG. 17) can use a mapping rule in a precoded-MSM table format as shown in Table 8 below.

TABLE 8

| | 1st symbol s(1) | | 2nd symbols s(2) | |
|---|---|---|---|---|
| b(0), b(1), b(2), b(3) | I(1) | Q(1) | I(2) | Q(2) |
| 0000 | $-1/\sqrt{2}$ | $-1/\sqrt{2}$ | 0 | 0 |
| 0001 | $-1/\sqrt{2}$ | 0 | 0 | $-1/\sqrt{2}$ |

TABLE 8-continued

| | 1st symbol s(1) | | 2nd symbols s(2) | |
|---|---|---|---|---|
| b(0), b(1), b(2), b(3) | I(1) | Q(1) | I(2) | Q(2) |
| 0010 | 0 | $-1/\sqrt{2}$ | $-1/\sqrt{2}$ | 0 |
| 0011 | 0 | 0 | $-1/\sqrt{2}$ | $-1/\sqrt{2}$ |
| 0100 | $-1/\sqrt{2}$ | 0 | 0 | $1/\sqrt{2}$ |
| 0101 | $-1/\sqrt{2}$ | $1/\sqrt{2}$ | 0 | 0 |
| 0110 | 0 | 0 | $-1/\sqrt{2}$ | $1/\sqrt{2}$ |
| 0111 | 0 | $1/\sqrt{2}$ | $-1/\sqrt{2}$ | 0 |
| 1000 | 0 | $-1/\sqrt{2}$ | $1/\sqrt{2}$ | 0 |
| 1001 | 0 | 0 | $1/\sqrt{2}$ | $-1/\sqrt{2}$ |
| 1010 | $1/\sqrt{2}$ | $-1/\sqrt{2}$ | 0 | 0 |
| 1011 | $1/\sqrt{2}$ | 0 | 0 | $-1/\sqrt{2}$ |
| 1100 | 0 | 0 | $1/\sqrt{2}$ | $1/\sqrt{2}$ |
| 1101 | 0 | $1/\sqrt{2}$ | $1/\sqrt{2}$ | 0 |
| 1110 | $1/\sqrt{2}$ | 0 | 0 | $1/\sqrt{2}$ |
| 1111 | $1/\sqrt{2}$ | $1/\sqrt{2}$ | 0 | 0 |

Referring to Table 8, a $1^{st}$ information symbol s(1)=I(1)+j Q(1) and a $2^{nd}$ information symbol s(2)=I(2)+j Q(2) are generated from 4 bits b(0), b(1), b(2), and b(3). The 20 modulation symbols d(0), d(1), . . . , d(19) may be generated from encoded bits (40 bits) according to the mapping rule of Table 8.

2. Resource Selection

Resource selection is a subset of MSM. In one OFDM symbol, one of a $1^{st}$ information symbol using a $1^{st}$ resource and a $2^{nd}$ information symbol using a $2^{nd}$ resource must be zero. For example, in FIG. 18, one of d(0) and d(10) must be zero, and one of d(1) and d(11) must be zero.

The resource selection can be performed by the modulator 112 (see FIG. 17). In the resource selection, the modulator 112 (see FIG. 17) can use a resource selection and mapping rule of Table 9 below.

TABLE 9

| | Symbol s(1) | | Symbol s(2) | |
|---|---|---|---|---|
| b(0), b(1), b(2) | I | Q | I | Q |
| 000 | $-1/\sqrt{2}$ | $-1/\sqrt{2}$ | 0 | 0 |
| 001 | 0 | 0 | $-1/\sqrt{2}$ | $-1/\sqrt{2}$ |
| 010 | $-1/\sqrt{2}$ | $1/\sqrt{2}$ | 0 | 0 |
| 011 | 0 | 0 | $-1/\sqrt{2}$ | $1/\sqrt{2}$ |
| 100 | 0 | 0 | $1/\sqrt{2}$ | $-1/\sqrt{2}$ |
| 101 | $1/\sqrt{2}$ | $-1/\sqrt{2}$ | 0 | 0 |
| 110 | 0 | 0 | $1/\sqrt{2}$ | $1/\sqrt{2}$ |
| 111 | $1/\sqrt{2}$ | $1/\sqrt{2}$ | 0 | 0 |

Figure 19:
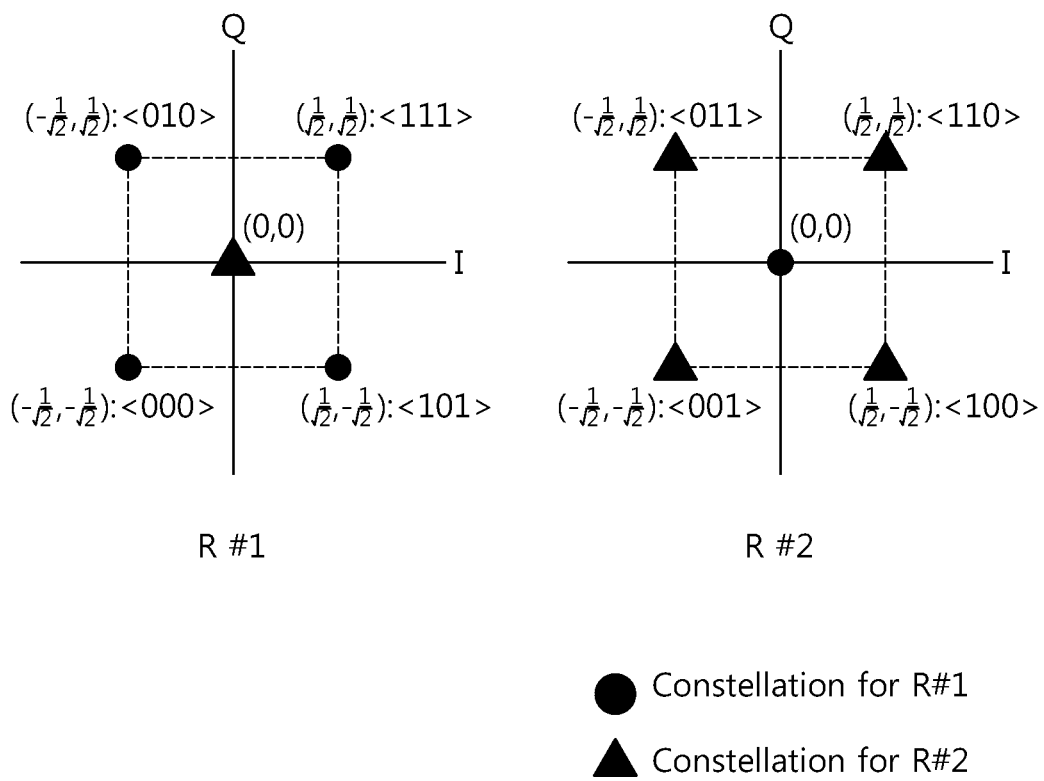
FIG. 19 shows a constellation according to a mapping rule of Table 9.

FIG. 19 shows a constellation according to a mapping rule of Table 9.

Referring to FIG. 19, the mapping rule is designed by considering a Euclidean distance. The Euclidean distance is the greatest in the diagonal of the constellation. For example, the Euclidean distance of (1/sqrt(2),1/sqrt(2)) and (−1/sqrt(2),−1/sqrt(2)) is the greatest. The greater the Euclidean distance, the smaller the possibility of error occurrence. Therefore, a bit having the greatest Hamming distance is located at a position having the greatest Euclidean distance.

For example, the following information bits (14 bits) are taken into consideration.

<1,1,0,0,0,0,0,0,0,1,0,0,0,0>

Tail-biting convolutional coding (TBCC) defined in 3GPP LTE can be applied to the information bits (14 bits) to generate encoded bits (42 (=14×3) bits).

<0,1,1,0,1,1,1,0,0,0,0,1,1,1,1,1,0,1,0,1,1,1,1,1,0,0,0,1,1, 1,0,1,1,1,1,1,1,1,0,0,0, 1>

Circular buffer rate matching can be performed on the encoded bits (42 bits) to generate rate-matched bits (30 bits).

<101, 011, 001, 000, 111, 011, 100, 101, 101, 111>

Modulation can be performed on the rate-matched bits (30 bits) according to Table 9 above to generate 10 modulation symbols d(0), . . . , d(9) as shown in Table 10 below.

TABLE 10

| | | d(0) | d(1) | d(2) | d(3) | d(4) | d(5) | d(6) | d(7) | d(8) | d(9) |
|---|---|---|---|---|---|---|---|---|---|---|---|
| R #1 | I | $1/\sqrt{2}$ | 0 | 0 | $-1/\sqrt{2}$ | $1/\sqrt{2}$ | 0 | 0 | $1/\sqrt{2}$ | $1/\sqrt{2}$ | $1/\sqrt{2}$ |
| | Q | $-1/\sqrt{2}$ | 0 | 0 | $-1/\sqrt{2}$ | $1/\sqrt{2}$ | 0 | 0 | $-1/\sqrt{2}$ | $-1/\sqrt{2}$ | $1/\sqrt{2}$ |
| R #2 | I | 0 | $-1/\sqrt{2}$ | $-1/\sqrt{2}$ | 0 | 0 | $-1/\sqrt{2}$ | $1/\sqrt{2}$ | 0 | 0 | 0 |
| | Q | 0 | $1/\sqrt{2}$ | $-1/\sqrt{2}$ | 0 | 0 | $1/\sqrt{2}$ | $-1/\sqrt{2}$ | 0 | 0 | 0 |

Referring to Table 10, the $2^{nd}$ information symbol s(2) is '0' in the modulation symbols d(0), d(3), d(4), d(7), d(8), d(9), and the $1^{st}$ information symbol s(1) is '0' in the remaining modulation symbols. If the $2^{nd}$ information symbol s(2) is '0', the $1^{st}$ resource is selected, and if the $1^{st}$ information symbol s(1) is '0', the $2^{nd}$ resource is selected. Herein, the resource may be a cyclically shifted sequence.

In Table 10 above, when selecting one of the two resources, QPSK modulation is performed on the selected resource. However, since this is for exemplary purposes only, any modulation scheme can be applied for a resource after selecting the resource.

Next, a case where transmission is performed by performing 8PSK modulation on the selected resource will be described. In this case, 16 (=8×2) encoded bits (4 bits) can be transmitted through one symbol space. The modulator 112 (see FIG. 17) can use a resource selection and mapping rule of Table 11 below.

TABLE 11

| | Symbol s(1) | | Symbol s(2) | |
|---|---|---|---|---|
| b(0), b(1), b(2), b(3) | I | Q | I | Q |
| 0000 | $-1/\sqrt{2}$ | $-1/\sqrt{2}$ | 0 | 0 |
| 0001 | −1 | 0 | 0 | 0 |
| 0010 | 0 | 0 | −1 | 0 |
| 0011 | 0 | 0 | $-1/\sqrt{2}$ | $-1/\sqrt{2}$ |
| 0100 | 0 | 0 | 0 | 1 |
| 0101 | $-1/\sqrt{2}$ | $1/\sqrt{2}$ | 0 | 0 |
| 0110 | 0 | 0 | $-1/\sqrt{2}$ | $1/\sqrt{2}$ |
| 0111 | 0 | 1 | 0 | 0 |
| 1000 | 0 | −1 | 0 | 0 |
| 1001 | 0 | 0 | $1/\sqrt{2}$ | $-1/\sqrt{2}$ |
| 1010 | $1/\sqrt{2}$ | $-1/\sqrt{2}$ | 0 | 0 |
| 1011 | 0 | 0 | 0 | −1 |
| 1100 | 0 | 0 | $1/\sqrt{2}$ | $1/\sqrt{2}$ |
| 1101 | 0 | 0 | 1 | 0 |
| 1110 | 1 | 0 | 0 | 0 |
| 1111 | $1/\sqrt{2}$ | $1/\sqrt{2}$ | 0 | 0 |

Figure 20:
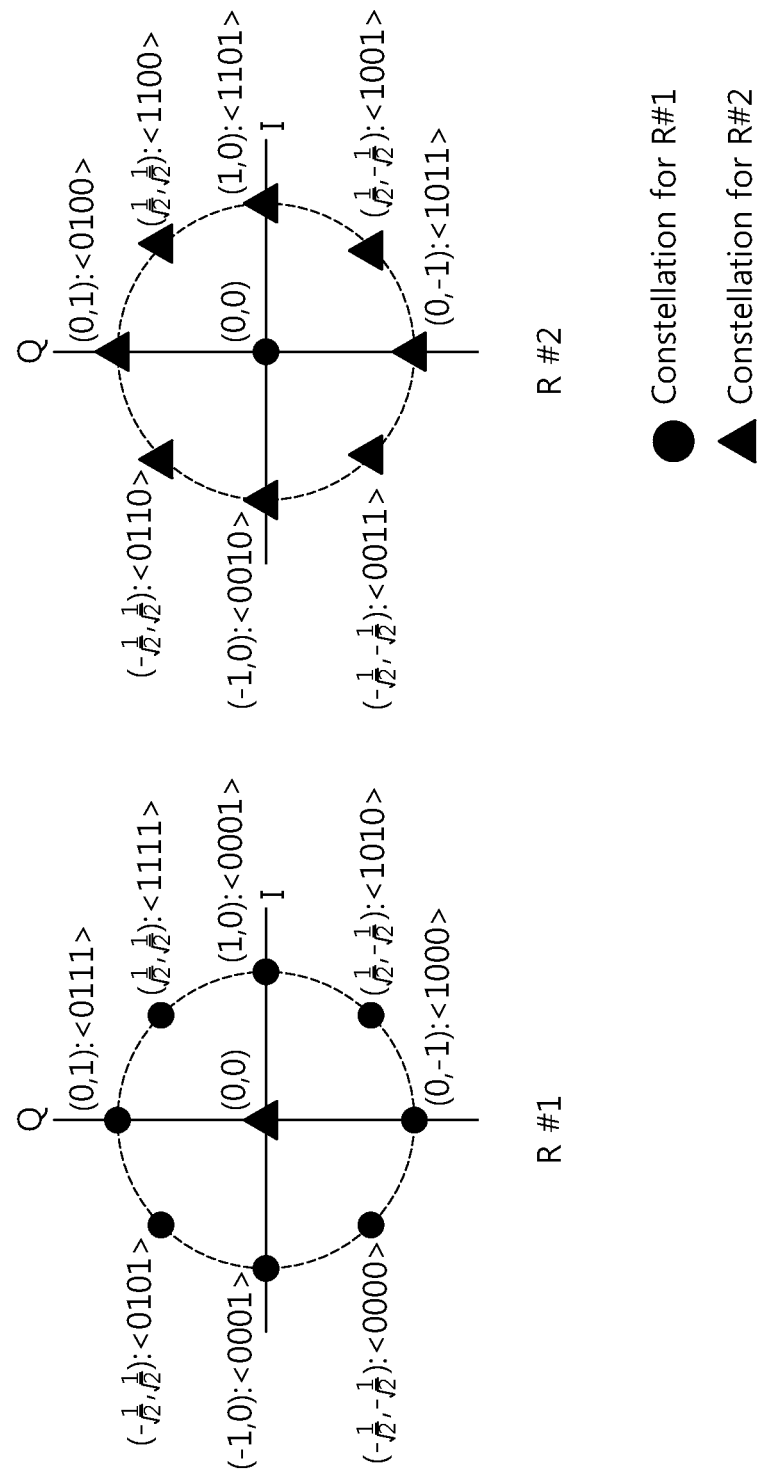
FIG. 20 shows a constellation according to a mapping rule of Table 11.

FIG. 20 shows a constellation according to a mapping rule of Table 11.

For example, the following information bits (14 bits) are taken into consideration.

<1,0,1,1,1,0,0,1,0,1,1,1,1>

TBCC can be applied to the information bits (14 bits) to generate encoded bits (42 (=14×3) bits).

<0,0,0,0,0,0,1,0,0,0,0,0,0,0,1,0,0,1,1,1,1,1,0,0,0,0,1,0,1, 1,1,0,1,0,1,0,0,0,1,0,1, 1>

Circular buffer rate matching can be performed on the encoded bits (42 bits) to generate rate-matched bits (40 bits).

<1000, 0001, 1100, 0000, 1010, 1100, 0000, 0000, 1111, 0101>

Modulation can be performed on the rate-matched bits (40 bits) according to Table 11 above to generate 10 modulation symbols d(0), . . . , d(9) as shown in Table 12 below.

TABLE 12

|      |   | d(0) | d(1) | d(2)        | d(3)         | d(4)         | d(5)        | d(6)         | d(7)         | d(8)        | d(9)         |
|------|---|------|------|-------------|--------------|--------------|-------------|--------------|--------------|-------------|--------------|
| R #1 | I | 0    | −1   | 0           | $-1/\sqrt{2}$ | $1/\sqrt{2}$ | 0           | $-1/\sqrt{2}$ | $-1/\sqrt{2}$ | $1/\sqrt{2}$ | $-1/\sqrt{2}$ |
|      | Q | −1   | 0    | 0           | $-1/\sqrt{2}$ | $-1/\sqrt{2}$ | 0           | $-1/\sqrt{2}$ | $-1/\sqrt{2}$ | $1/\sqrt{2}$ | $1/\sqrt{2}$  |
| R #2 | I | 0    | 0    | $1/\sqrt{2}$ | 0            | 0            | $1/\sqrt{2}$ | 0            | 0            | 0           | 0            |
|      | Q | 0    | 0    | $1/\sqrt{2}$ | 0            | 0            | $1/\sqrt{2}$ | 0            | 0            | 0           | 0            |

Referring to Table 12, the $1^{st}$ information symbol s(1) is '0' in the modulation symbols d(2) and d(5), and the $2^{nd}$ information symbol s(2) is '0' in the remaining modulation symbols. If the $1^{st}$ information symbol s(1) is '0', the $2^{nd}$ resource is selected, and if the $2^{nd}$ information symbol s(2) is '0', the $1^{st}$ resource is selected. Herein, the resource may be a cyclically shifted sequence.

Although it is assumed that two resource indices are allocated to the transmitter 100 for convenience of explanation, it is also possible to allocate three or more resource indices to the transmitter 100. In this case, the number of information sequence generators that can be included in the transmitter 100 may be equal to the number of resource indices.

Figure 21:
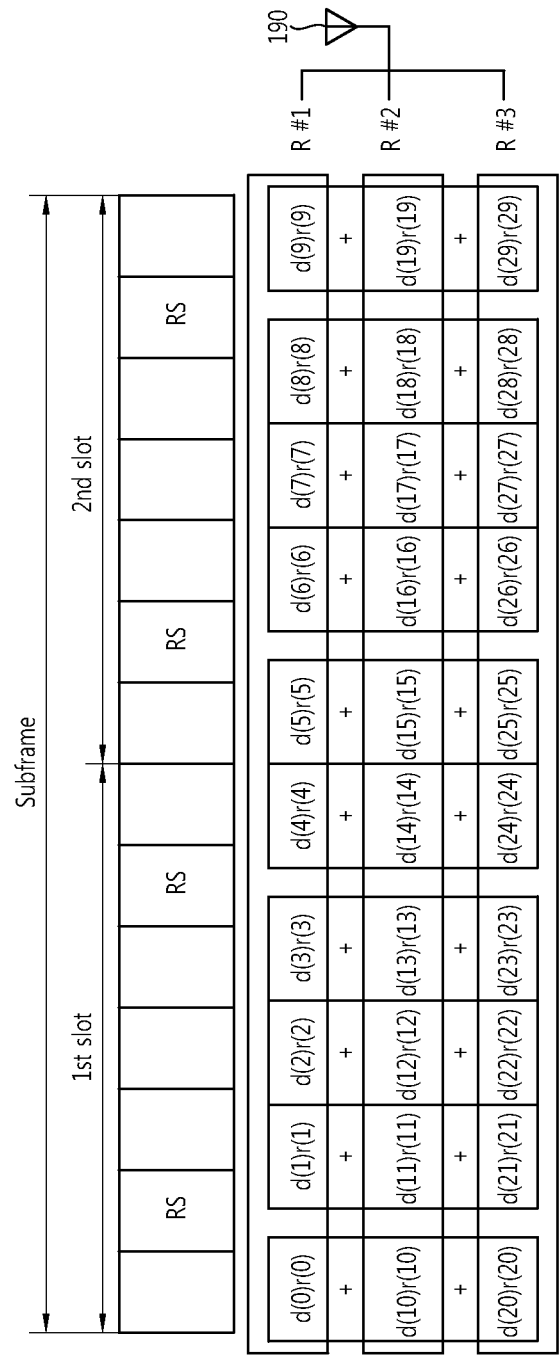
FIG. 21 shows an example of information transmission using three resources through one antenna.

FIG. 21 shows an example of information transmission using three resources through one antenna.

Referring to FIG. 21, an information sequence is generated in a normal CP in the same format as the PUCCH format 2. 10 modulation symbols may be transmitted by performing QPSK modulation on encoded bits (20 bits) on the basis of one resource index. When using three resource indices, 30 modulation symbols d(0), d(1), . . . , d(29) can be transmitted by performing QPSK modulation on encoded bits (60 bits). The symbols d(0), d(1), . . . , d(9) correspond to a $1^{st}$ information symbol, the symbols d(10), d(11), . . . , d(19) correspond to a $2^{nd}$ information symbol, and the symbols d(20), d(21), . . . , d(29) correspond to a $3^{rd}$ information symbol.

A sequence r(Ics) is determined for each OFDM symbol of an information part from each of the $1^{st}$ to $3^{rd}$ resource indices. For example, the sequence r(Ics) may be a cyclically shifted sequence.

$1^{st}$ sequences determined for respective OFDM symbols of the information part from the $1^{st}$ resource index are r(0), r(1), . . . , r(9). Herein, the sequence index Ics of each of the $1^{st}$ sequences is for exemplary purposes only. $1^{st}$ information sequences are d(0)r(0), d(1)r(1), . . . , d(9)r(9).

$2^{nd}$ sequences determined for respective OFDM symbols of the information part from the $2^{nd}$ resource index are r(10), r(11), . . . , r(19). Herein, the sequence index Ics of each of the $2^{nd}$ sequences is for exemplary purposes only. $2^{nd}$ information sequences are d(10)r(10), d(11)r(11), . . . , d(19)r(19).

$3^{rd}$ sequences determined for respective OFDM symbols of the information part from the $3^{rd}$ resource index are r(20), r(21), . . . , r(29). Herein, the sequence index Ics of each of the $3^{rd}$ sequences is for exemplary purposes only. $3^{rd}$ information sequences are d(20)r(20), d(21)r(21), . . . , d(29)r(29).

The $1^{st}$ sequences are a $1^{st}$ resource R#1 identified from the $1^{st}$ resource index. The $2^{nd}$ sequences are a $2^{nd}$ resource R#2 identified from the $2^{nd}$ resource index. The $3^{rd}$ sequences are a $3^{rd}$ resource R#3 identified from the $3^{rd}$ resource index.

The resource index may further identify a resource block in addition to a sequence. In this case, the $1^{st}$ information sequence is mapped to a $1^{st}$ resource block determined from the $1^{st}$ resource index, the $2^{nd}$ information sequence is mapped to a $2^{nd}$ resource block determined from the $2^{nd}$ resource index, and the $3^{rd}$ information sequence is mapped to a $3^{rd}$ resource block determined from the $3^{rd}$ resource index.

The $1^{st}$ resource is the $1^{st}$ sequences and the $1^{st}$ resource block, the $2^{nd}$ resource is the $2^{nd}$ sequences and the $2^{nd}$ resource block, and the $3^{rd}$ resource is the $3^{rd}$ sequences and the $3^{rd}$ resource block. The $1^{st}$ resource, the $2^{nd}$ resource, and the $3^{rd}$ resource are orthogonal to each other.

Although MSM is applied for three resources herein, resource selection may also be applied. When applying the resource selection, a single-carrier property can be maintained. In this case, instead of QPSK, a modulation scheme having another modulation order can be used. For example, 8PSK modulation can be used.

Alternatively, the resource selection may be applied only for two resources out of the three resources. 8PSK-based resource selection is applied to the two resources. In this case, 10 modulation symbols are generated from encoded bits (40 bits) among encoded bits (60 bits). The conventional QPSK modulation can be applied to the remaining one resource. In this case, 10 modulation symbols are generated from the remaining encoded bits (20 bits).

Figure 22:
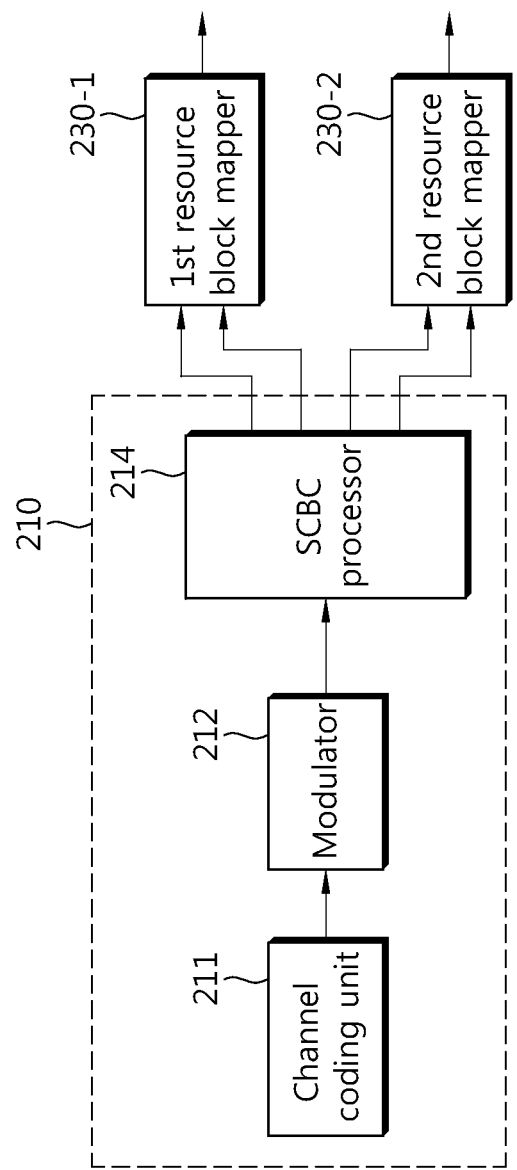
FIG. 22 is a block diagram showing another exemplary structure of a part of a transmitter including two antennas.

FIG. 22 is a block diagram showing another exemplary structure of a part of a transmitter including two antennas.

Referring to FIG. 22, an information processor 210 includes a channel coding unit 211, a modulator 212, and a space-code block code (SCBC) processor 214. The SCBC processor 214 is coupled to $1^{st}$ and $2^{nd}$ resource mappers 230-1 and 230-2.

It is assumed that a $1^{st}$ information symbol s(1) and a $2^{nd}$ information symbol s(2) are information symbols corresponding to information to be transmitted by the transmitter 200.

The SCBC processor 214 generates a $1^{st}$ Tx symbol and a $4^{th}$ Tx symbol on the basis of an Alamouti code from the $1^{st}$ information symbol s(1) and the $2^{nd}$ information symbol s(2).

Hereinafter, a Tx signal matrix is defined as a 2×2 matrix of which elements are $1^{st}$ to $4^{th}$ Tx symbols. An element of an $i^{th}$ row and a $j^{th}$ column of the Tx signal matrix is expressed by (i,j) (where i=1,2 and j=1,2). Hereinafter, (1,1) denotes the $1^{st}$ Tx symbol, (2,1) denotes the $2^{nd}$ Tx symbol, (1,2) denotes the $3^{rd}$ Tx symbol, and (2,2) denotes the $4^{th}$ Tx symbol. The $4^{th}$ Tx symbols is a complex conjugate of the $1^{st}$ Tx symbol, and the $3^{rd}$ Tx symbol is obtained by appending a minus sign to a complex conjugate of the $2^{nd}$ Tx symbol. Alternatively, the $4^{th}$ Tx symbol is obtained by appending a minus sign to a complex conjugate of the $1^{st}$ Tx symbol, and the $3^{rd}$ Tx symbols is a complex conjugate of the $2^{nd}$ Tx symbol.

A Tx signal matrix can be expressed by Equation 15 below.

$$\begin{bmatrix} s(1) & s(2) \\ -s(2)^* & s(1)^* \end{bmatrix} \quad \text{[Equation 15]}$$

In Equation 15, a row and/or column of the Tx signal matrix may correspond to a Tx antenna, a resource index, etc. For example, rows of the Tx signal matrix may correspond to respective resource indices, and columns thereof may correspond to respective Tx antennas.

The Tx signal matrix expressed in Equation 15 above is for exemplary purposes only, and is not for restricting a format of the Tx signal matrix. The Tx signal matrix includes all possible unitary transforms of the matrix of Equation 15 above. In this case, the unitary transform includes not only a transform for the $1^{st}$ information symbol s(1) and the $2^{nd}$ information symbol s(2) but also a transform in a state where s(1) and s(2) are separated into a real part and an imaginary part.

Table 13 below shows various examples of the Tx signal matrix.

TABLE 13

| (1) | $\begin{bmatrix} s_1 & s_2 \\ -s_2^* & s_1^* \end{bmatrix}$ |
|---|---|
| (2) | $\begin{bmatrix} s_1^* & s_2 \\ -s_2^* & s_1 \end{bmatrix}$ |
| (3) | $\begin{bmatrix} s_1 & s_2^* \\ -s_2 & s_1^* \end{bmatrix}$ |
| (4) | $\begin{bmatrix} s_1^* & s_2^* \\ -s_2 & s_1 \end{bmatrix}$ |
| (5) | $\begin{bmatrix} s_1 & -s_2 \\ s_2^* & s_1^* \end{bmatrix}$ |
| (6) | $\begin{bmatrix} s_1^* & -s_2 \\ s_2^* & s_1 \end{bmatrix}$ |
| (7) | $\begin{bmatrix} s_1 & -s_2^* \\ s_2 & s_1^* \end{bmatrix}$ |
| (8) | $\begin{bmatrix} s_1^* & -s_2^* \\ s_2 & s_1 \end{bmatrix}$ |

Table 14 below shows another example of the Tx signal matrix.

TABLE 14

| (1) | $\begin{bmatrix} s_1 & s_2 \\ s_2^* & -s_1^* \end{bmatrix}$ |
|---|---|
| (2) | $\begin{bmatrix} s_1^* & s_2 \\ s_2^* & -s_1 \end{bmatrix}$ |
| (3) | $\begin{bmatrix} s_1 & s_2^* \\ s_2 & -s_1^* \end{bmatrix}$ |
| (4) | $\begin{bmatrix} s_1^* & s_2^* \\ s_2 & -s_1 \end{bmatrix}$ |
| (5) | $\begin{bmatrix} -s_1 & s_2 \\ s_2^* & s_1^* \end{bmatrix}$ |
| (6) | $\begin{bmatrix} -s_1^* & s_2 \\ s_2^* & s_1 \end{bmatrix}$ |
| (7) | $\begin{bmatrix} -s_1 & s_2^* \\ s_2 & s_1^* \end{bmatrix}$ |
| (8) | $\begin{bmatrix} -s_1^* & s_2^* \\ s_2 & s_1 \end{bmatrix}$ |

The SCBC processor 214 generates $1^{st}$ to $4^{th}$ information sequences as follows, on the basis of the $1^{st}$ to $4^{th}$ information symbols and the $1^{st}$ and $2^{nd}$ resource indices.

The $1^{st}$ information sequence is generated based on the $1^{st}$ Tx symbol and the $1^{st}$ resource index.

The $2^{nd}$ information sequence is generated based on the $2^{nd}$ Tx symbol and the $2^{nd}$ resource index.

The $3^{rd}$ information sequence is generated based on the $3^{rd}$ Tx symbol and the $3^{rd}$ resource index.

The $4^{th}$ information sequence is generated based on the $4^{th}$ Tx symbol and the $4^{th}$ resource index.

The SCBC processor 214 inputs the $1^{st}$ information sequence and the $2^{nd}$ information sequence to the $1^{st}$ resource block mapper 230-1. The SCBC processor 214 inputs the $3^{rd}$ information sequence and the $4^{th}$ information sequence to the $2^{nd}$ resource block mapper 230-2.

Therefore, the $1^{st}$ information sequence and the $2^{nd}$ information sequence may be combined and transmitted through the $1^{st}$ antenna 290-1 (see FIG. 15). The $2^{nd}$ information sequence and the $4^{th}$ information sequence may be combined and transmitted through the $2^{nd}$ antenna 290-1 (see FIG. 15). To decrease a cubic metric (CM), a phase of at least one information sequence may change when combining one information sequence to another information sequence. Alternatively, a phase of a Tx symbol may change before the information sequence is generated. For example, the $2^{nd}$ information sequence may be combined with the $1^{st}$ information sequence by phase-shifting the $2^{nd}$ information sequence by a specific phase. In addition, the $4^{th}$ information sequence may be combined with the $3^{rd}$ information sequence by phase-shifting the $4^{th}$ information sequence by the specific phase. In case of BPSK, the specific phase may be 90 degrees. In case of QPSK, the specific phase may be 45 degrees.

By applying the SCBC to the 10 modulation symbols d(0), . . . , d(0) of Table 12, the $1^{st}$ to $4^{th}$ information symbols can be obtained as expressed by Table 15 below.

TABLE 15

|  |  | d(0) | d(1) | d(2) | d(3) | d(4) | d(5) | d(6) | d(7) | d(8) | d(9) |
|---|---|---|---|---|---|---|---|---|---|---|---|
| Antenna #1 | | | | | | | | | | | |
| R #1 | I | 0 | −1 | 0 | −1/√2 | 1/√2 | 0 | −1/√2 | −1/√2 | 1/√2 | −1/√2 |
|  | Q | −1 | 0 | 0 | −1/√2 | −1/√2 | 0 | −1/√2 | −1/√2 | 1/√2 | 1/√2 |
| R #2 | I | 0 | 0 | 1/√2 | 0 | 0 | 1/√2 | 0 | 0 | 0 | 0 |
|  | Q | 0 | 0 | 1/√2 | 0 | 0 | 1/√2 | 0 | 0 | 0 | 0 |
| Antenna #2 | | | | | | | | | | | |
| R #1 | I | 0 | 0 | −1/√2 | 0 | 0 | −1/√2 | 0 | 0 | 0 | 0 |
|  | Q | 0 | 0 | 1/√2 | 0 | 0 | 1/√2 | 0 | 0 | 0 | 0 |
| R #2 | I | 0 | −1 | 0 | −1/√2 | 1/√2 | 0 | −1/√2 | −1/√2 | 1/√2 | −1/√2 |
|  | Q | 1 | 0 | 0 | 1/√2 | 1/√2 | 0 | 1/√2 | 1/√2 | −1/√2 | −1/√2 |

Referring to Table 15, the $1^{st}$ Tx symbols is the $1^{st}$ information symbol s(1), and the $2^{nd}$ Tx symbol is the $2^{nd}$ information symbol s(2). The $3^{rd}$ Tx symbol is −s(2)*, and the $4^{th}$ Tx symbols is s(1)*. That is, this is a case where the same Tx signal matrix as the matrix (7) of Table 13 is used.

s(1) is transmitted through a $1^{st}$ antenna by using a $1^{st}$ resource.

s(2) is transmitted through the $1^{st}$ antenna by using a $2^{nd}$ resource.

−s(2)* is transmitted through a $2^{nd}$ antenna by using the $1^{st}$ resource.

s(1)* is transmitted through the $2^{nd}$ antenna by using the $2^{nd}$ resource.

As such, when CDM/FDM is used as a multiplexing scheme, information can be transmitted by using a resource according to SCBC. The transmitter can perform smart repetition by using an antenna and a resource, thereby being able to obtain a diversity gain and to increase reliability of wireless communication. Hereinafter, such an information transmission method is called an SCBC information transmission method.

Figure 23:
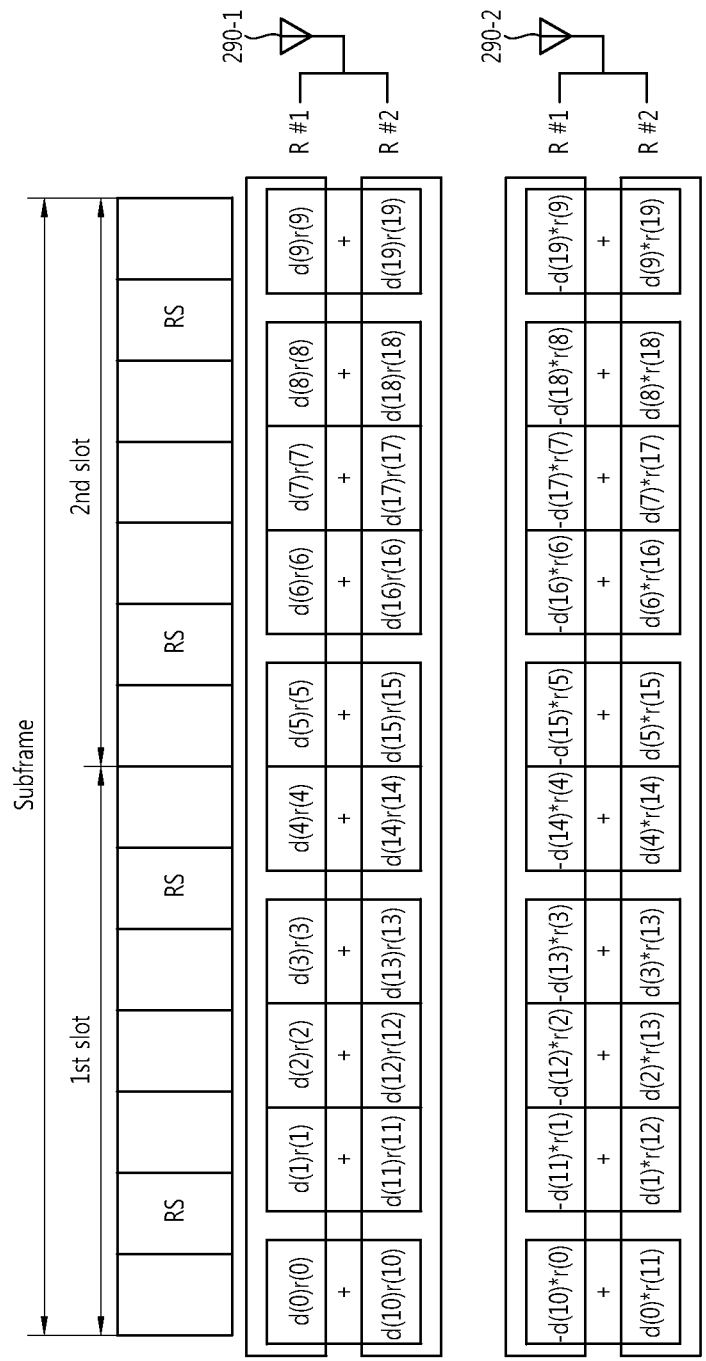
FIG. 23 shows an example of an SCBC information transmission method.

FIG. 23 shows an example of an SCBC information transmission method.

Referring to FIG. 23, an information sequence is generated in a normal CP in the same format as the PUCCH format 2. A $1^{st}$ Tx symbols is a $1^{st}$ information symbol s(1), and a $2^{nd}$ Tx symbol is a $2^{nd}$ information symbol s(2). A $3^{rd}$ Tx symbol is −s(2)*, and a $4^{th}$ Tx symbols is s(1)*. That is, this is a case where the same Tx signal matrix as the matrix (7) of Table 13 is used.

Symbols d(0), d(1), . . . , d(9) correspond to the $1^{st}$ information symbol, and symbols d(10), d(11), . . . , d(19) correspond to the $2^{nd}$ information symbol.

s(1) is transmitted through the $1^{st}$ antenna 290-1 (see FIG. 15) by using a $1^{st}$ resource R#1.

s(2) is transmitted through the $1^{st}$ antenna 290-1 (see FIG. 15) by using a $2^{nd}$ resource R#2.

−s(2)* is transmitted through the $2^{nd}$ antenna 290-2 (see FIG. 15) by using the $1^{st}$ resource R#1.

s(1)* is transmitted through the $2^{nd}$ antenna 290-2 (see FIG. 15) by using the $2^{nd}$ resource R#2.

Although MSM is applied for two resources in this case, resource selection may also be applied.

In the SCBC information transmission method, a resource index allocated to an information part is not one-to-one mapped to an antenna. However, an RS has to be generated for each antenna in order to perform channel estimation for each antenna. For this, each resource index can be allowed to be mapped to each antenna in a one-to-one manner. Therefore, an RS for the $1^{st}$ antenna can be generated based on a $1^{st}$ resource index, and an RS for the $2^{nd}$ antenna can be generated based on a $2^{nd}$ resource index.

For SCBC information transmission, it is described above that the $2^{nd}$ resource index is further allocated to the transmitter in addition to the $1^{st}$ resource index. However, if different information has already been allocated by using a different resource index, the $2^{nd}$ resource index is not necessarily allocated additionally.

The $2^{nd}$ resource index may be predetermined for the $1^{st}$ resource index. Alternatively, the $2^{nd}$ resource index may be explicitly signaled. Alternatively, the $2^{nd}$ resource index may be implicitly mapped according to a specific relation.

For example, when transmitting HARQ ACK/NACK for each of a $1^{st}$ DL carrier and a $2^{nd}$ DL carrier, the $1^{st}$ resource index can be obtained from a $1^{st}$ CCE index of a PDCCH transmitted through the $1^{st}$ DL carrier. The $2^{nd}$ resource index can be obtained from a $1^{st}$ CCE index of a PDCCH transmitted through the $2^{nd}$ DL carrier.

If it is assumed that 18 UEs can be multiplexed per one resource block in case of single-antenna transmission, 9 UEs can be multiplexed per one resource block when using an SCBC transmission method employing two antennas. In case of the PUCCH format 1/1a/1b, the same information is transmitted in a $1^{st}$ slot and a $2^{nd}$ slot. A resource block allocated to the PUCCH is hopped in a slot level. That is, by transmitting information through different subcarriers over time, a frequency diversity gain can be obtained. However, if a sufficient diversity gain can be obtained by using the SCBC transmission method, the same control information as that of the $1^{st}$ slot is not necessarily transmitted in the $1^{st}$ slot. Therefore, different information can be transmitted in the $1^{st}$ slot and the $2^{nd}$ slot. In this case, UE multiplexing capacity of the SCBC transmission method for the two antennas may be maintained to be the same as UE multiplexing capacity of single-antenna transmission. For example, in case of the single-antenna transmission, if 18 UEs are multiplexed per one resource block, 18 UEs can also be multiplexed per one resource block even in the SCBC transmission method for the two antennas.

y(1) denotes a $1^{st}$ Rx signal for the $1^{st}$ information sequence generated based on the $1^{st}$ resource index. y(2) denotes a $2^{nd}$ Rx signal for the $2^{nd}$ information sequence generated based on the $2^{nd}$ resource index. An actual Rx signal y is a combination of the $1^{st}$ Rx signal y1 and the $2^{nd}$ Rx signal y2, i.e., y=y(1)+y(2). However, it is assumed that the Rx signal y can be split into the $1^{st}$ Rx signal y1 and the $2^{nd}$ Rx signal y2 by using a de-spreading operation. For convenience of explanation, it is assumed that a receiver has one Rx antenna.

An Rx signal matrix can be expressed by Equation 16 below.

$$\begin{bmatrix} y(1) \\ y(2) \end{bmatrix} = \begin{bmatrix} s(1) & s(2) \\ -s(2)^* & s(1)^* \end{bmatrix} \begin{bmatrix} h(1) \\ h(2) \end{bmatrix} + \begin{bmatrix} n(1) \\ n(2) \end{bmatrix}$$ [Equation 16]

In Equation 16, h(1) denotes a channel for the $1^{st}$ antenna 290-1, h(2) denotes a channel for the $2^{nd}$ antenna 290-1, n(1) denotes noise of the $1^{st}$ Rx signal, and n(2) denotes noise of the $2^{nd}$ Rx signal. Herein, the noise may be AWGN.

In general, if Tx power is limited, a normalization factor corresponding to the number of Tx antennas can be used. For convenience of explanation, the normalization factor is omitted in the following description.

Equation 16 above can be equivalently expressed by Equation 17 below.

$$\begin{bmatrix} y(1) \\ y(2)^* \end{bmatrix} = \begin{bmatrix} h(1) & h(2) \\ h(2)^* & -h(1)^* \end{bmatrix} \begin{bmatrix} s(1) \\ s(2) \end{bmatrix} + \begin{bmatrix} n(1) \\ n(2)^* \end{bmatrix}$$ [Equation 17]

Equation 17 above can be modified to Equation 18 below.

[Equation 18]

$$\begin{bmatrix} h(1) & h(2) \\ h(2)^* & -h(1)^* \end{bmatrix}^H \begin{bmatrix} y(1) \\ y(2)^* \end{bmatrix} = \begin{bmatrix} h(1) & h(2) \\ h(2)^* & -h(1)^* \end{bmatrix}^H$$

$$\begin{bmatrix} h(1) & h(2) \\ h(2)^* & -h(1)^* \end{bmatrix} \begin{bmatrix} s(1) \\ s(2) \end{bmatrix} +$$

$$\begin{bmatrix} h(1) & h(2) \\ h(2)^* & -h(1)^* \end{bmatrix}^H \begin{bmatrix} n(1) \\ n(2)^* \end{bmatrix}$$

$$= \begin{bmatrix} |h(1)|^2 + |h(2)|^2 & 0 \\ 0 & |h(1)|^2 + |h(2)|^2 \end{bmatrix}$$

$$\begin{bmatrix} s(1) \\ s(2) \end{bmatrix} + \begin{bmatrix} n'(1) \\ n'(2) \end{bmatrix}$$

In Equation 18, $(\bullet)^H$ denotes a Hermitian matrix. The $1^{st}$ symbol $s_1$ and the $2^{nd}$ symbol $s_2$ are orthogonally separated. The receiver can obtain a diversity gain expressed by Equation 12. This is the same diversity gain as the MRC which is the optimal combination.

Although it is described herein that the number of Tx antennas is 2 for convenience of explanation, the number of Tx antennas is not limited thereto.

When the transmitter includes M antennas (where M is a natural number), M resource indices can be allocated. The M antennas can be one-to-one mapped to the M resource indices, respectively. If the number of Tx antennas is 3 or more, the SCBC information transmission method can be used in combination with other Tx diversity schemes such as cyclic delay diversity (CDD) or precoding vector switching (PVS). For example, when using 4 Tx antennas, the 4 Tx antennas can be divided by two, and thus can be grouped into two antenna groups. The SCBC information transmission method is applied to each of the two antenna groups, and the CDD or the PVS can be applied between the groups.

The SCBC information transmission method is an optimal transmit method and can obtain a full spatial diversity gain. However, two resources have to be paired to each other for two antennas. That is, the SCBC information transmission method cannot be applied when the number of resources is an odd number. Therefore, there is a need to provide an information transmission method using an odd number of resources.

Figure 24:
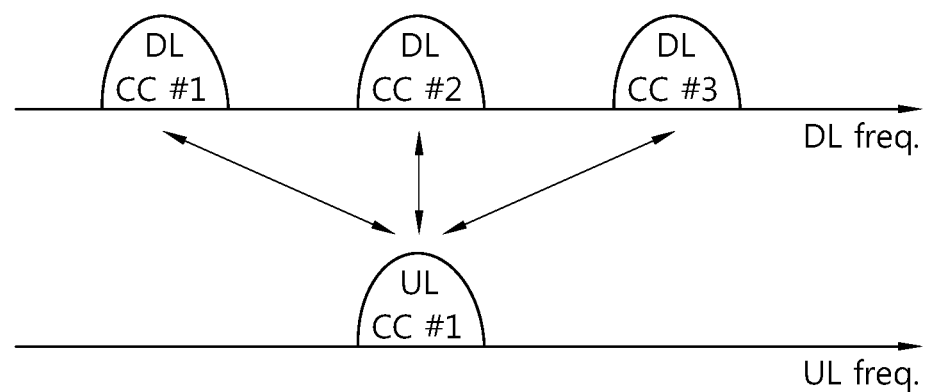
FIG. 24 shows an example of a multiple-carrier system having an asymmetric structure.

FIG. 24 shows an example of a multiple-carrier system having an asymmetric structure.

Referring to FIG. 24, the multiple-carrier system consists of 3 DL carriers, i.e., DL CC #1, DL CC #2, and DL CC #3, and one UL carrier, i.e., UL CC #1.

If CQI has to be transmitted for each DL carrier, in the simplest method, the CQI can be fed back through multi-sequence transmission similarly to MSM by using three resources. In addition, even if ACK/NACK is transmitted through a PUCCH for each DL carrier, it can be transmitted through multi-channelization by using three resources. Both the PUCCH format 1/1a/1b and the PUCCH format 2/2a/2b can be used.

For example, it is assumed that the transmitter can use information by using three resources in the situation of FIG. 24.

Figure 25:
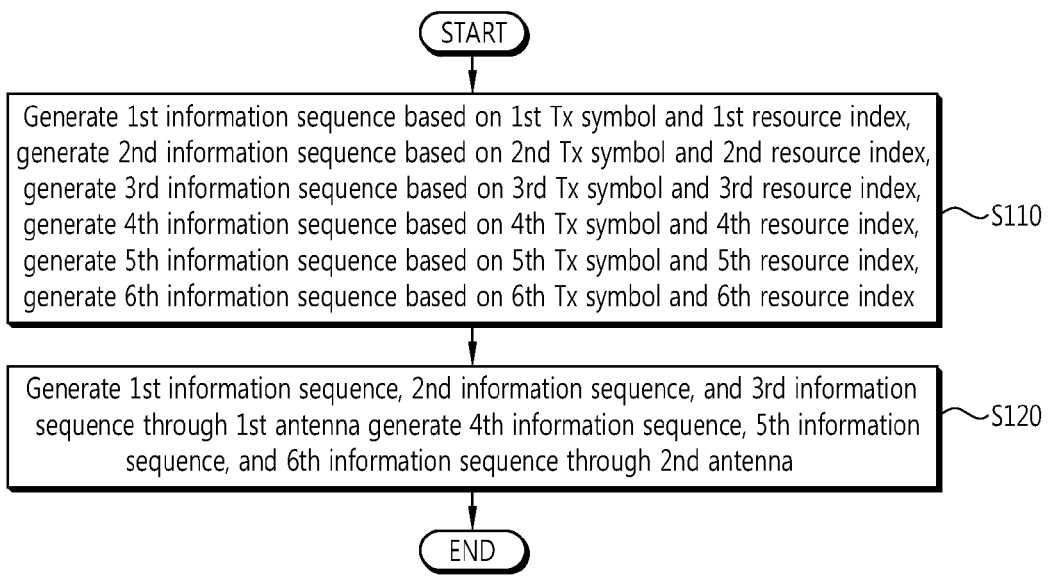
FIG. 25 is a flowchart showing a method in which a transmitter transmits information through two antennas by using three resources according to an embodiment of the present invention.

FIG. 25 is a flowchart showing a method in which a transmitter transmits information through two antennas by using three resources according to an embodiment of the present invention.

Referring to FIG. 25, the transmitter generates a $1^{st}$ information sequence based on a $1^{st}$ Tx symbol and a $1^{st}$ resource index, generates a $2^{nd}$ information sequence based on a $2^{nd}$ Tx symbol and a $2^{nd}$ resource index, generates a $3^{rd}$ information sequence based on a $3^{rd}$ Tx symbol and a $3^{rd}$ resource index, generates a $4^{th}$ information sequence based on a $4^{th}$ Tx symbol and a $4^{th}$ resource index, generates a $5^{th}$ information sequence based on a $5^{th}$ Tx symbol and a $5^{th}$ resource index, and generates a $6^{th}$ information sequence based on a $6^{th}$ Tx symbol and a $6^{th}$ resource index (step S110).

The transmitter transmits the $1^{st}$ information sequence, the $2^{nd}$ information sequence, and the $3^{rd}$ information sequence through a $1^{st}$ antenna, and transmits the $4^{th}$ information sequence, the $5^{th}$ information sequence, and the $6^{th}$ information sequence through a $2^{nd}$ antenna (step S120).

The $5^{th}$ Tx symbol is a complex conjugate of the $1^{st}$ Tx symbol, and the $4^{th}$ Tx symbol is obtained by appending a minus sign to a complex conjugate of the $2^{nd}$ Tx symbol. Alternatively, the $5^{th}$ Tx symbol is obtained by appending a minus sign to a complex conjugate of the $1^{st}$ Tx symbol, and the $4^{th}$ Tx symbol is a complex conjugate of the $2^{nd}$ Tx symbol.

An RS part is transmitted in an OSRTD manner in order to perform channel estimation for each antenna. When using two antennas, only two resource indices can be used out of three resource indices so that RSs can be transmitted in an orthogonal manner for the respective antennas.

The $1^{st}$ resource index identifies a $1^{st}$ resource. The $2^{nd}$ resource index identifies a $2^{nd}$ resource. The $3^{rd}$ resource index identifies a $3^{rd}$ resource. SCBC is applied to a resource pair which is a group of the $1^{st}$ resource and the $2^{nd}$ resource.

Various information transmission methods can be applied for the $3^{rd}$ resource. Space time block coding (STBC), PVS, simple repetition, CDD, conjugate, etc., can be applied to the $3^{rd}$ resource.

For example, among encoded bits (60 bits), encoded bits (40 bits) are transmitted through two antennas (i.e., the $1^{st}$ antenna and the $2^{nd}$ antenna) by using two resources (i.e., the $1^{st}$ resource and the $2^{nd}$ resource). The remaining encoded bits (20 bits) are transmitted through the two antennas (i.e., the $1^{st}$ antenna and the $2^{nd}$ antenna) by using one resource (i.e., the $3^{rd}$ resource).

Figure 26:
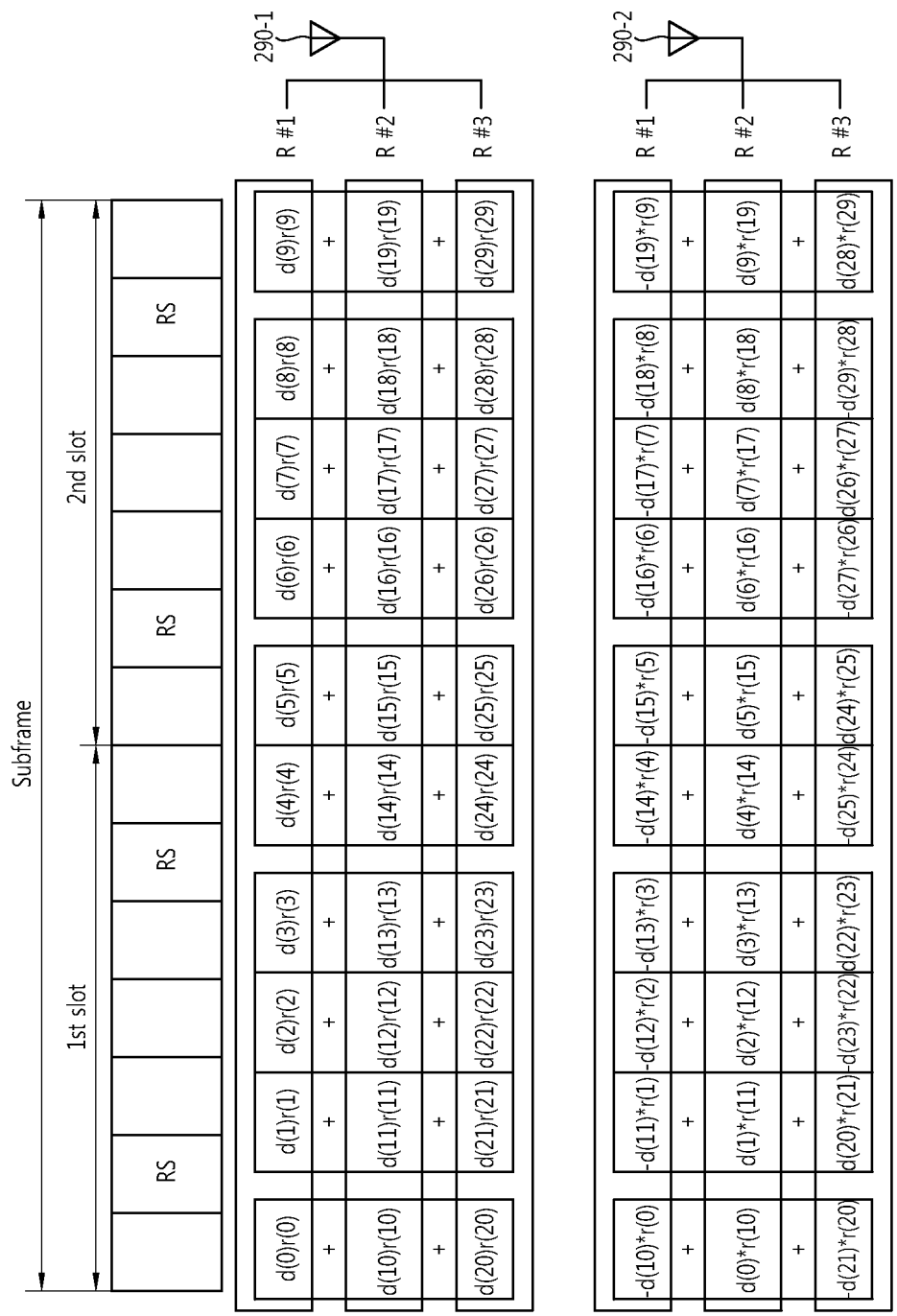
FIG. 26 shows an example of information transmission using three resources through two antennas.

FIG. 26 shows an example of information transmission using three resources through two antennas.

Referring to FIG. 26, an information sequence is generated in a normal CP in the same format as the PUCCH format 2. This is a case where the same Tx signal matrix as the matrix (7) of Table 13 is used. Since resource selection is a subset of MSM in a broader sense, the following description will be based on the MSM.

A $1^{st}$ resource R#1, a $2^{nd}$ resource R#2, and a $3^{rd}$ resource R#3 are as follows.

$1^{st}$ resource R#1: r(0), r(1), ..., r(9)
$2^{nd}$ resource R#2: r(10), r(11), ..., r(19)
$3^{rd}$ resource R#3: r(20), r(21), ..., r(29)

The $1^{st}$ Tx symbol s(1) is d(0), d(1), ..., d(9). The $2^{nd}$ Tx symbol s(2) is d(10), d(11), ..., d(19). The $4^{th}$ Tx symbol is −s(2)*, and the $5^{th}$ Tx symbol is s(1)*. SCBC is applied for the $1^{st}$ resource R#1 and the $2^{nd}$ resource R#2.

The $3^{rd}$ Tx symbol is a plurality of complex-valued symbols d(20), d(21), ..., d(29). Each of the plurality of complex-valued symbols corresponds to an OFDM symbol of an information part. STBC is applied to the $6^{th}$ Tx symbol and the $3^{rd}$ information symbol. STBC may be applied by pairing the plurality of symbols into two complex-valued symbols. The symbol pair consisting of two complex-valued symbols may correspond to contiguous OFDM symbols of the information part.

When the $3^{rd}$ Tx symbol includes a $1^{st}$ complex-valued symbol and a $2^{nd}$ complex-valued symbol and the $6^{th}$ Tx symbol includes a $3^{rd}$ complex-valued symbol and a $4^{th}$ complex-valued symbol, then the $4^{th}$ complex-valued symbol may be a conjugate complex of the $1^{st}$ complex-valued symbol and the $3^{rd}$ complex-valued symbol may be obtained by appending a minus sign to a complex conjugate of the $2^{nd}$ complex-valued symbol. Alternatively, the $4^{th}$ complex-valued symbol may be obtained by appending a minus sign to a complex conjugate of the $1^{st}$ complex-valued symbol, and the $3^{rd}$ complex-valued symbol may be a complex conjugate of the $2^{nd}$ complex-valued symbol. The $1^{st}$ complex-valued symbol and the $2^{nd}$ complex-valued symbol are contiguous OFDM symbols of the information part.

Among three resources, SCBC is applied to the $1^{st}$ resource R#1 and the $2^{nd}$ resource R#2, and STBC is applied to the remaining $3^{rd}$ resource R#3.

When applying STBC, there may be unpaired symbols which cannot constitute a symbol pair in a subframe. The unpaired symbols may exist according to whether slot hopping is on/off, whether SRS transmission is performed, etc. When the unpaired symbols exist, one of CDD, PVS, conjugate, simple repetition, etc., may be applied.

Figure 27:
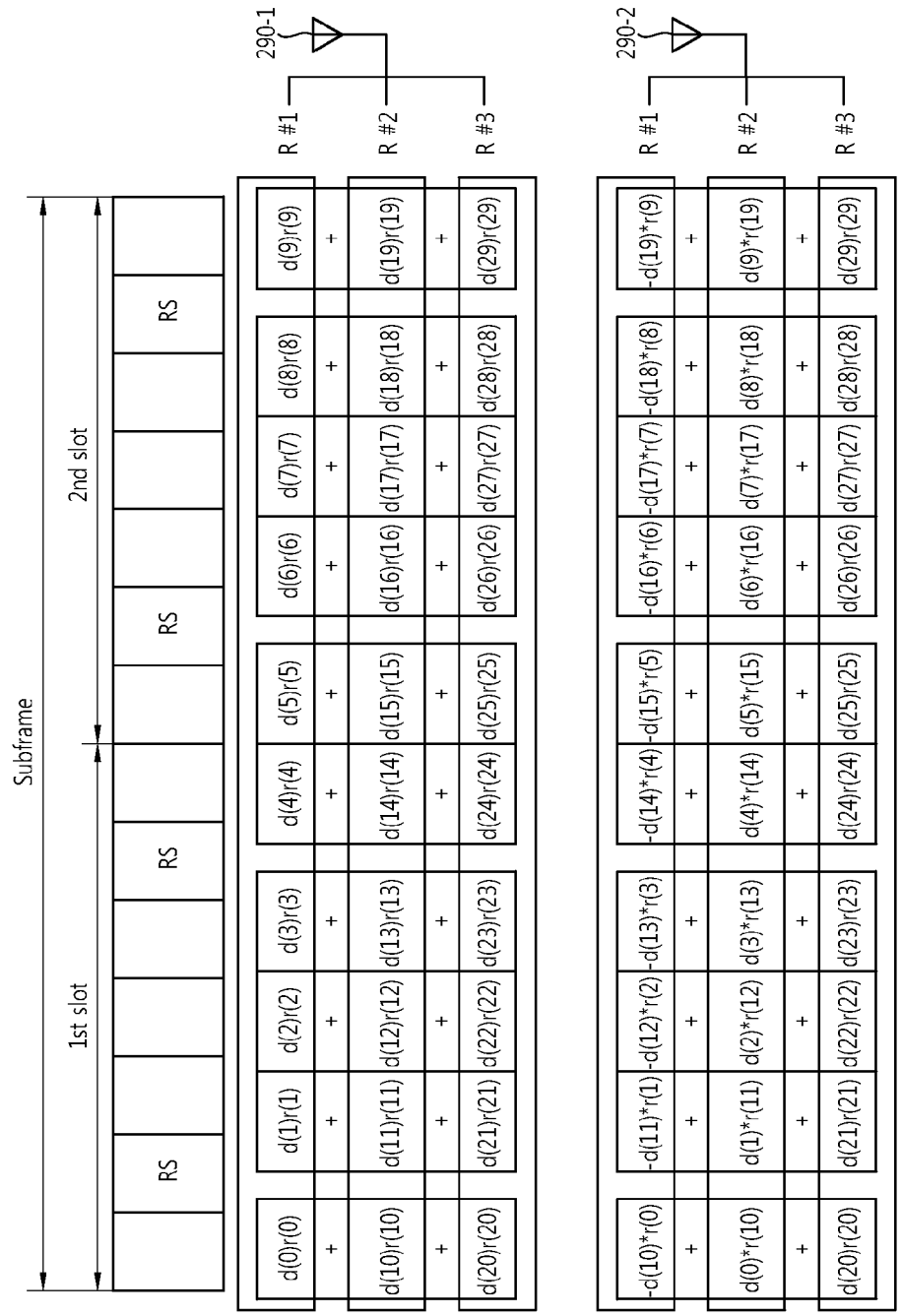
FIG. 27 shows another example of information transmission using three resources through two antennas.

FIG. 27 shows another example of information transmission using three resources through two antennas.

Referring to FIG. 27, among the three resources, SCBC is applied to the $1^{st}$ resource R#1 and the $2^{nd}$ resource R#2, and simple repetition is applied to the remaining $3^{rd}$ resource R#3. A $3^{rd}$ Tx symbol is d(20), d(21), ..., d(29), and a $6^{th}$ Tx symbol is d(20), d(21), ..., d(29). That is, the $3^{rd}$ Tx symbol and the $6^{th}$ Tx symbol are identical to each other.

As to the $3^{rd}$ resource, the same information sequence is transmitted through a $1^{st}$ antenna and a $2^{nd}$ antenna. As such, simple repetition implies that the same Tx symbol is transmitted using the same resource.

In this case, CDD may be applied. For example, an OFDM signal generated after mapping a $3^{rd}$ information sequence to a resource block may be transmitted through the $1^{st}$ antenna. Further, an OFDM signal which is cyclically delayed from an OFDM signal transmitted through the $1^{st}$ antenna may be transmitted through the $2^{nd}$ antenna. CDD may be applied in an OFDM symbol unit, a slot unit, or a subframe unit. In this case, a cyclic delay value of CDD may be predetermined.

Figure 28:
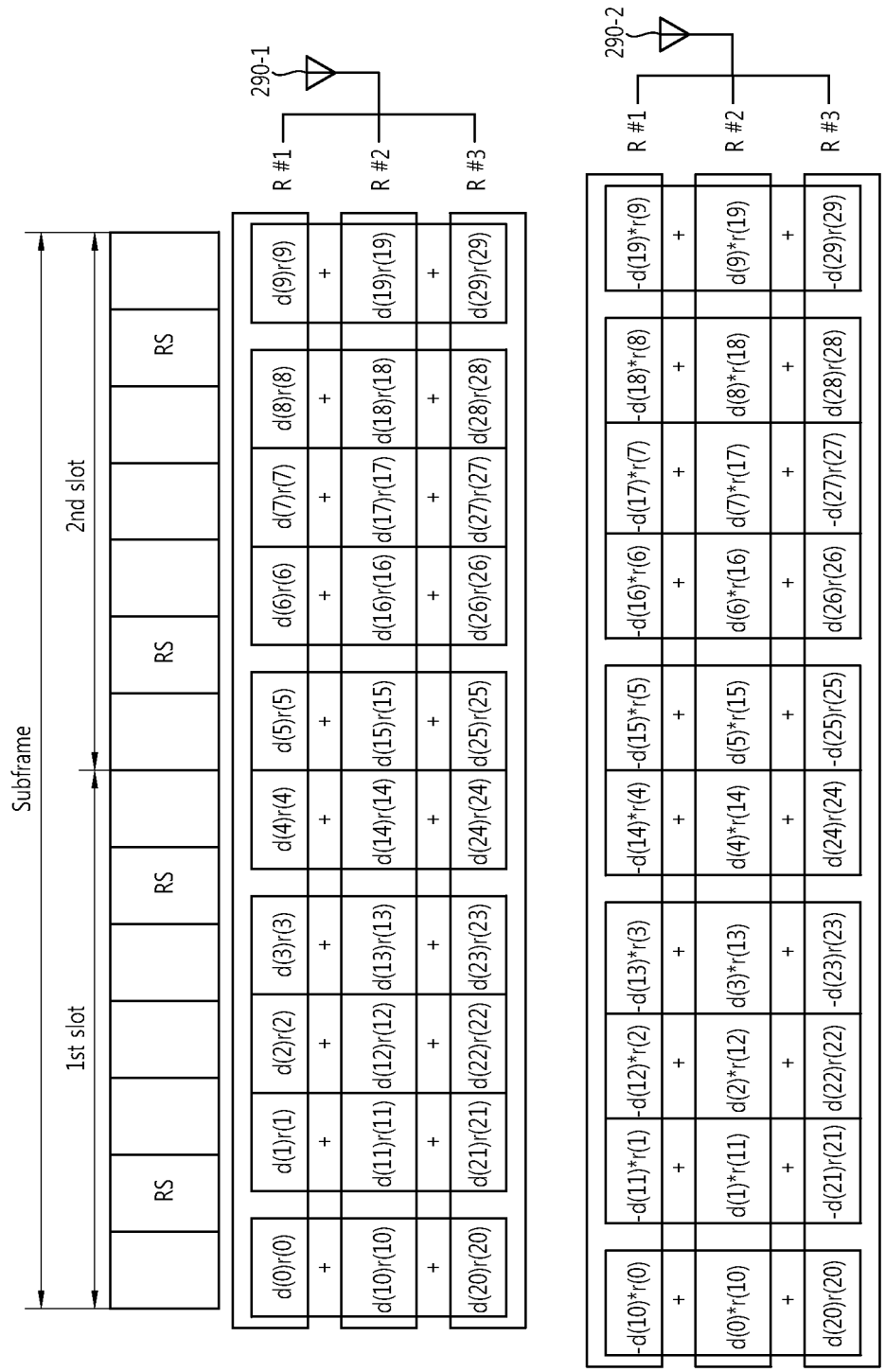
FIG. 28 shows another example of information transmission by using three resources through two antennas.

FIG. 28 shows another example of information transmission by using three resources through two antennas.

Referring to FIG. 28, among the three resources, SCBC is applied to the $1^{st}$ resource R#1 and the $2^{nd}$ resource R#2, and PVS is applied to the remaining $3^{rd}$ resource R#3. A $3^{rd}$ Tx symbol and a $6^{th}$ Tx symbol are obtained by applying a pre-coding matrix or a precoding vector to the same Tx symbol. When applying PVS, a precoding matrix value or a precoding vector value may be predetermined.

Herein, a precoding vector $p(0)=[1\ 1]^T$, $p(1)=[1\ -1]^T$ is used. Precoding vectors p(0) and p(1) are alternately applied according to a symbol index order. However, this is for exemplary purposes only, and thus another precoding vector may also be used.

Tx symbols used as the $3^{rd}$ Tx symbol and the $6^{th}$ Tx symbol are d(20), d(22), ..., d(29). Herein, p(0) and p(1) are applied according to a symbol index order. The $3^{rd}$ resource is r(20), r(21), ..., r(29).

An information sequence carried on the $3^{rd}$ resource in each OFDM symbol of the information part can be expressed by Equation 19 below.

$$p(m)d(n)r(n) \qquad \text{[Equation 19]}$$

In Equation 19, n is 20, 21, ..., 29, and m=mod(n,2).

In addition thereto, SCBC may be applied to the $1^{st}$ resource R#1 and the $2^{nd}$ resource R#2 among the three resources, and conjugate may be applied to the remaining $3^{rd}$ resource R#3. For example, the $6^{th}$ Tx symbol may be a complex conjugate of the $3^{rd}$ Tx symbol or may be obtained by appending a minus sign to a complex conjugate of the $3^{rd}$ Tx symbol. For example, if the $3^{rd}$ Tx symbol is d(20), d(22), ..., d(29), the $6^{th}$ Tx symbol may be d(20)*, d(22)*, ..., d(29)* or −d(20)*, −d(22)*, ..., −d(29)*. When conjugate is applied for the $3^{rd}$ resource, a conjugate property can be predetermined.

Figure 29:
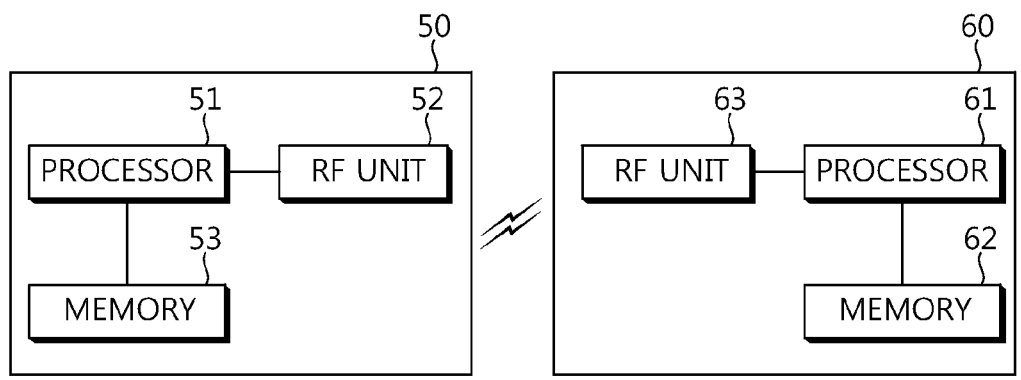
FIG. 29 is a block diagram showing wireless communication system to implement an embodiment of the present invention.

FIG. 29 is a block diagram showing wireless communication system to implement an embodiment of the present invention. A BS 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A UE 60 may include a processor 61, a memory 62 and a RF unit 63. The processor 61 may be configured to implement proposed functions, procedures and/or methods described in this description. Layers of the radio interface protocol may be implemented in the processor 51. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

According to the present invention, a method and apparatus for effectively transmitting information in a wireless communication system can be provided. Multiple antenna transmission can be performed effectively by using an odd number of resources. Therefore, reliability of wireless communication can be increased, and overall system performance can be improved.

Additional advantages, objectives, and features of the present invention will become more apparent to those of ordinary skill in the art upon implementation of the present invention based on the aforementioned descriptions or explanation. Moreover, other unexpected advantages may be found as those ordinary skilled in the art implement the present invention based on the aforementioned explanations.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

Various modifications may be made in the aforementioned embodiments. Although all possible combinations of the various modifications of the embodiments cannot be described, those ordinary skilled in that art will understand possibility of other combinations. For example, those ordinary skilled in the art will be able to implement the invention by combining respective structures described in the aforementioned embodiments. Therefore, the present invention is not intended to be limited to the embodiments shown herein but is to be accorded the widest scope consistent with the principles and novel features disclosed herein.

What is claimed is:

1. A method for information transmission performed by a transmitter in a wireless communication system, the method comprising:

generating a first information sequence based on a first transmission symbol and a first resource index;
generating a second information sequence based on a second transmission symbol and a second resource index;
generating a third information sequence based on a third transmission symbol and a third resource index;
generating a fourth information sequence based on a fourth transmission symbol and a fourth resource index;
generating a fifth information sequence based on a fifth transmission symbol and a fifth resource index;
generating a sixth information sequence based on a sixth transmission symbol and a sixth resource index; and
transmitting the first information sequence, the second information sequence, and the third information sequence through a first antenna, and transmitting the fourth information sequence, the fifth information sequence, and the sixth information sequence through a second antenna,
wherein the fifth transmission symbol is a complex conjugate of the first transmission symbol, and the fourth transmission symbol is obtained by appending a minus sign to a complex conjugate of the second transmission symbol.

2. The method of claim 1, wherein the third transmission symbol includes a first complex-valued symbol and a second complex-valued symbol, and the sixth transmission symbol includes a third complex-valued symbol and a fourth complex-valued symbol,
wherein the fourth complex-valued symbol is a complex conjugate of the first complex-valued symbol and the third complex-valued symbol is obtained by appending a minus sign to a complex conjugate of the second complex-numbered symbol.

3. The method of claim 2, wherein the first complex-valued symbol and the second complex-valued symbol respectively correspond to contiguous orthogonal frequency division multiplexing (OFDM) symbols.

4. The method of claim 1, wherein the third transmission symbol and the sixth transmission symbol are equivalent to each other.

5. The method of claim 4, wherein the sixth information sequence is transmitted by being cyclically delayed with respect to the third information sequence.

6. The method of claim 4, wherein the third transmission symbol and the sixth transmission symbol are obtained by applying a precoding matrix to the same transmission symbol.

7. The method of claim 1, wherein the sixth transmission symbol is a complex conjugate of the third transmission symbol or is obtained by appending a minus sign to the complex conjugate of the third transmission symbol.

8. The method of claim 1, further comprising:
determining a sequence and a resource block from a resource index,
wherein:
at least the first, second, third, fourth, fifth, or sixth information sequence is generated based on a corresponding transmission symbol among the first, second, third, fourth, fifth, and sixth transmission symbols and the determined sequence; and
the generated at least the first, second, third, fourth, fifth, or sixth information sequence is mapped to the resource block.

9. The method of claim 1, further comprising:
determining a first sequence, a second sequence, and a resource block from a resource index;
generating a two-dimensional spread information sequence based on a transmission symbol corresponding to at least the first sequence or the second sequence; and
mapping the first sequence, the second sequence, and the two-dimensional spread information sequence to the resource block.

10. The method of claim 9, wherein the first sequence is a cyclically shifted sequence, and the second sequence is an orthogonal sequence.

11. A transmitter comprising:
- an information processor configured for generating a first information sequence based on a first transmission symbol and a first resource index, generating a second information sequence based on a second transmission symbol and a second resource index, generating a third information sequence based on a third transmission symbol and a third resource index, generating a fourth information sequence based on a fourth transmission symbol and a fourth resource index, generating a fifth information sequence based on a fifth transmission symbol and a fifth resource index, and generating a sixth information sequence based on a sixth transmission symbol and a sixth resource index;
- a first antenna, coupled to the information processor, and configured for transmitting the first information sequence, the second information sequence, and the third information sequence; and
- a second antenna, coupled to the information processor, and configured for transmitting the fourth information sequence, the fifth information sequence, and the sixth information sequence,
- wherein the fifth transmission symbol is a complex conjugate of the first transmission symbol, and the fourth transmission symbol is obtained by appending a minus sign to a complex conjugate of the second transmission symbol.

* * * * *